US006637029B1

(12) United States Patent
Maissel et al.

(10) Patent No.: US 6,637,029 B1
(45) Date of Patent: Oct. 21, 2003

(54) INTELLIGENT ELECTRONIC PROGRAM GUIDE

(75) Inventors: Jonathan Maissel, Jerusalem (IL); Amir Eilat, Tel Aviv (IL); Yossef Tsuria, Shoham (IL); Moshe Kranc, Jerusalem (IL); Yishai Sered, Jerusalem (IL); Gershon Bar-On, Mizrah Binyamin (IL); Shabtai Atlow, Efrat (IL); David Zviel, Efrat (IL)

(73) Assignee: NDS Limited, Staines (GB)

( * ) Notice: Subject to any disclaimer, the term of this patent is extended or adjusted under 35 U.S.C. 154(b) by 0 days.

(21) Appl. No.: 09/242,871

(22) PCT Filed: Jun. 30, 1998

(86) PCT No.: PCT/IL98/00307

§ 371 (c)(1),
(2), (4) Date: Jun. 10, 1999

(87) PCT Pub. No.: WO99/01984

PCT Pub. Date: Jan. 14, 1999

(30) Foreign Application Priority Data

Jul. 3, 1997 (IL) .................................................. 121230

(51) Int. Cl.[7] .......................... H04N 5/445; G06F 3/00; G06F 13/00; G09G 5/00
(52) U.S. Cl. ............................. 725/46; 725/39; 725/43; 345/854; 345/804
(58) Field of Search ...................... 725/32–34, 37–40, 725/43–46; 386/125; 345/721, 804, 853–854; 358/86

(56) References Cited

U.S. PATENT DOCUMENTS

| 3,341,833 | A | 9/1967 | Jones |
| 3,645,539 | A | 2/1972 | Jenkins |
| 3,682,363 | A | 8/1972 | Hull |
| 4,080,626 | A | 3/1978 | Hurst et al. |
| 4,272,787 | A | 6/1981 | Michael et al. |

(List continued on next page.)

FOREIGN PATENT DOCUMENTS

| EP | 0 584 991 A2 | 3/1994 | |
| GB | 2 210 526 A | 6/1989 | |
| WO | 98/08192 | 2/1980 | ............. G06T/1/00 |
| WO | 9000847 | 1/1990 | |
| WO | 90/00847 | 1/1990 | .......... H04N/7/087 |

(List continued on next page.)

OTHER PUBLICATIONS

Angus et al., "Embedding the 2D Interaction Metaphor in a Real 3D Virtual Environment" (SPIE vol. 2409 pp. 282–293, 1995).

Ceccarelli, M.P.; "Metadata for Broadcasting" (MPEG–7 Workshop, XP.002117667, 1998).

Gessler et al.; "PDAs as mobile WWW Browsers" (Computer Networks and ISDN Systems, vol. 28, pp. 53–59, 1995).

(List continued on next page.)

*Primary Examiner*—Andrew Faile
*Assistant Examiner*—Hai V. Tran
(74) *Attorney, Agent, or Firm*—Welsh & Katz, Ltd.

(57) ABSTRACT

A subscriber unit for use in a television system including a television network and transmitting apparatus for transmitting program schedule information, the subscriber unit including a receiving unit for receiving the program schedule information, a profile storage unit for storing at least one viewer preference profile of at least one television viewer, an intelligent agent for customizing the program schedule information based, at least in part, on the viewer preference profile, to produce a program guide including customized program schedule information, and display apparatus for displaying the program guide.

20 Claims, 21 Drawing Sheets

U.S. PATENT DOCUMENTS

| | | | | |
|---|---|---|---|---|
| 4,283,735 | A | 8/1981 | Jagger | |
| 4,319,286 | A | 3/1982 | Hanpachern | |
| 4,408,309 | A | 10/1983 | Kiesling et al. | |
| 4,430,676 | A | 2/1984 | Johnson | |
| 4,445,195 | A | 4/1984 | Yamamoto | |
| 4,488,179 | A | 12/1984 | Kruger et al. | |
| 4,530,048 | A | 7/1985 | Proper | |
| 4,602,279 | A | 7/1986 | Freeman | 358/86 |
| 4,633,331 | A | 12/1986 | McGrady et al. | |
| 4,706,121 | A | 11/1987 | Young | |
| 4,768,095 | A | 8/1988 | Wada et al. | |
| 4,774,582 | A | 9/1988 | Hakamada et al. | |
| 4,777,531 | A | 10/1988 | Hakamada et al. | |
| 4,876,670 | A | 10/1989 | Nakabayashi et al. | |
| 4,885,775 | A | 12/1989 | Lucas | |
| 4,891,715 | A | 1/1990 | Levy | |
| 4,908,713 | A | 3/1990 | Levine | |
| 4,924,732 | A | 5/1990 | Hoskins et al. | |
| 4,930,158 | A | 5/1990 | Vogel | |
| 4,963,866 | A | 10/1990 | Duncan | |
| 4,963,994 | A | 10/1990 | Levine | |
| 4,963,995 | A | 10/1990 | Lang | |
| 4,977,455 | A | 12/1990 | Young | 358/142 |
| 4,991,033 | A | 2/1991 | Takeshita | |
| 5,021,893 | A | 6/1991 | Scheffler | |
| 5,038,211 | A | 8/1991 | Hallenbeck | 358/142 |
| 5,046,093 | A | 9/1991 | Wachob | |
| 5,063,453 | A | 11/1991 | Yoshimura et al. | |
| 5,151,789 | A | 9/1992 | Young | 358/194.1 |
| 5,189,517 | A | 2/1993 | Ohara | |
| 5,191,423 | A | 3/1993 | Yoshida | |
| 5,223,924 | A * | 6/1993 | Strubbe | 358/86 |
| 5,235,643 | A | 8/1993 | Anderson et al. | 380/33 |
| 5,241,428 | A | 8/1993 | Goldwasser et al. | |
| 5,293,357 | A | 3/1994 | Hallenbeck | |
| 5,323,240 | A | 6/1994 | Amano et al. | 348/731 |
| 5,353,121 | A | 10/1994 | Young et al. | 348/563 |
| 5,371,551 | A | 12/1994 | Logan et al. | 348/571 |
| 5,390,027 | A | 2/1995 | Henmi et al. | |
| 5,396,545 | A | 3/1995 | Nair et al. | |
| 5,410,326 | A | 4/1995 | Goldstein | |
| 5,410,344 | A | 4/1995 | Graves et al. | |
| 5,436,676 | A | 7/1995 | Pint et al. | |
| 5,440,336 | A | 8/1995 | Buhro et al. | |
| 5,444,499 | A | 8/1995 | Saitoh | |
| 5,446,488 | A | 8/1995 | Vogel | |
| 5,465,113 | A | 11/1995 | Gilboy | 348/5.5 |
| 5,477,262 | A | 12/1995 | Banker et al. | |
| 5,479,266 | A | 12/1995 | Young et al. | 358/335 |
| 5,479,268 | A | 12/1995 | Young et al. | 358/335 |
| 5,479,302 | A | 12/1995 | Haines | |
| 5,481,752 | A | 1/1996 | Suzuki et al. | |
| 5,483,278 | A | 1/1996 | Strubbe et al. | 348/7 |
| 5,488,571 | A | 1/1996 | Jacobs et al. | |
| 5,491,795 | A * | 2/1996 | Beaudet et al. | 345/804 |
| 5,508,815 | A | 4/1996 | Levine | |
| 5,508,940 | A | 4/1996 | Rossmere et al. | |
| 5,515,106 | A | 5/1996 | Chaney et al. | 348/461 |
| 5,517,187 | A | 5/1996 | Bruwer et al. | |
| 5,519,448 | A | 5/1996 | Nagasawa et al. | |
| 5,524,195 | A | 6/1996 | Clanton, III et al. | 395/155 |
| 5,526,401 | A | 6/1996 | Roach, Jr. et al. | |
| 5,530,469 | A | 6/1996 | Garfinkle | 348/1 |
| 5,534,911 | A * | 7/1996 | Levitan | 725/46 |
| 5,535,147 | A | 7/1996 | Jacobs et al. | |
| 5,539,449 | A | 7/1996 | Blahut et al. | |
| 5,550,576 | A | 8/1996 | Klosterman | 348/6 |
| 5,552,837 | A | 9/1996 | Mankovitz | |
| 5,556,107 | A | 9/1996 | Carter | |
| 5,557,538 | A | 9/1996 | Retter et al. | |
| 5,561,543 | A | 10/1996 | Ogawa et al. | |
| 5,561,708 | A | 10/1996 | Remillard | |
| 5,561,709 | A | 10/1996 | Remillard | |
| 5,564,088 | A | 10/1996 | Saitoh | 455/186.1 |
| 5,566,069 | A | 10/1996 | Clark, Jr. et al. | |
| 5,568,272 | A | 10/1996 | Levine | |
| 5,583,560 | A | 12/1996 | Florin et al. | 348/7 |
| 5,585,858 | A | 12/1996 | Harper et al. | |
| 5,585,865 | A | 12/1996 | Amano et al. | |
| 5,619,250 | A | 4/1997 | McClellan et al. | |
| 5,619,251 | A | 4/1997 | Kuroiwa et al. | |
| 5,621,456 | A | 4/1997 | Florin et al. | |
| 5,621,473 | A | 4/1997 | Hill | |
| 5,623,690 | A | 4/1997 | Palmer et al. | |
| 5,629,733 | A | 5/1997 | Youman et al. | |
| 5,635,978 | A | 6/1997 | Alten et al. | 348/7 |
| 5,635,989 | A * | 6/1997 | Rothmuller | 725/46 |
| D382,878 | S | 8/1997 | Erlin | |
| 5,654,747 | A | 8/1997 | Ottesen et al. | |
| 5,657,072 | A | 8/1997 | Aristides et al. | |
| 5,659,366 | A * | 8/1997 | Kerman | 725/34 |
| 5,664,046 | A * | 9/1997 | Abecassis | 386/125 |
| 5,664,948 | A | 9/1997 | Dimitriadis et al. | |
| 5,666,645 | A | 9/1997 | Thomas et al. | 455/6.1 |
| 5,671,226 | A | 9/1997 | Murakami et al. | |
| 5,675,390 | A | 10/1997 | Schindler et al. | |
| 5,675,524 | A | 10/1997 | Bernard | |
| 5,701,383 | A | 12/1997 | Russo et al. | |
| 5,703,997 | A | 12/1997 | Kitamura | |
| 5,708,840 | A | 1/1998 | Kikinis et al. | |
| 5,710,605 | A | 1/1998 | Nelson | |
| 5,717,814 | A | 2/1998 | Abecassis | |
| 5,717,923 | A | 2/1998 | Dedrick | 395/613 |
| 5,721,815 | A | 2/1998 | Ottesen et al. | |
| 5,721,827 | A | 2/1998 | Logan et al. | 395/200.47 |
| 5,721,878 | A | 2/1998 | Ottesen et al. | |
| 5,727,060 | A | 3/1998 | Young | |
| 5,728,998 | A | 3/1998 | Novis et al. | |
| 5,737,029 | A | 4/1998 | Ohkura et al. | |
| 5,737,527 | A | 4/1998 | Shiels et al. | |
| 5,751,883 | A | 5/1998 | Ottesen et al. | |
| 5,752,244 | A | 5/1998 | Rose et al. | |
| 5,754,773 | A | 5/1998 | Ozden et al. | |
| 5,758,257 | A | 5/1998 | Herz et al. | |
| 5,760,821 | A | 6/1998 | Ellis et al. | 348/10 |
| 5,767,893 | A | 6/1998 | Chen et al. | |
| 5,767,896 | A | 6/1998 | Nemirofsky | |
| 5,774,186 | A | 6/1998 | Brodsky et al. | |
| 5,793,438 | A * | 8/1998 | Bedard | 725/43 |
| 5,801,747 | A * | 9/1998 | Bedard | 725/46 |
| 5,819,092 | A | 10/1998 | Ferguson et al. | 395/701 |
| 5,867,799 | A | 2/1999 | Lang et al. | 707/1 |
| 5,892,536 | A | 4/1999 | Logan et al. | 348/13 |
| 5,940,073 | A * | 8/1999 | Klosterman et al. | 725/40 |
| 5,945,988 | A | 8/1999 | Williams et al. | |
| 5,973,683 | A | 10/1999 | Cragun et al. | |
| 5,977,964 | A | 11/1999 | Williams et al. | |
| 5,986,692 | A | 11/1999 | Logan et al. | 348/13 |
| 5,991,735 | A | 11/1999 | Gerace | 705/10 |
| 6,020,883 | A * | 2/2000 | Herz et al. | 345/721 |
| 6,044,403 | A | 3/2000 | Gerszberg et al. | 709/225 |
| 6,078,348 | A * | 6/2000 | Klosterman et al. | 725/40 |
| 6,088,722 | A | 7/2000 | Herz et al. | 709/217 |
| 6,119,098 | A | 9/2000 | Guyot et al. | 705/14 |
| 6,128,009 | A | 10/2000 | Ohkura et al. | |
| 6,133,909 | A * | 10/2000 | Schein et al. | 345/721 |
| 6,151,059 | A * | 11/2000 | Schein et al. | 725/34 |
| 6,247,176 | B1 * | 6/2001 | Schein et al. | 725/43 |
| 6,286,140 | B1 | 9/2001 | Ivanyi | |
| 6,324,338 | B1 | 11/2001 | Wood et al. | |
| 6,405,370 | B1 | 6/2002 | Jarrell | |

| | | | |
|---|---|---|---|
| 6,438,752 B1 | 8/2002 | McClard | |
| 6,446,261 B1 * | 9/2002 | Rosser | 725/34 |
| 2001/0007147 A1 | 7/2001 | Goldschmidt et al. | |
| 2002/0053084 A1 | 5/2002 | Escobar et al. | |
| 2002/0056098 A1 | 5/2002 | White | |
| 2002/0059094 A1 | 5/2002 | Hosea et al. | |
| 2002/0059606 A1 | 5/2002 | Kikinis et al. | |
| 2002/0077880 A1 | 6/2002 | Gordon et al. | |
| 2002/0083468 A1 | 6/2002 | Dudkiewicz | |
| 2002/0087979 A1 | 7/2002 | Dudkiewicz et al. | |
| 2002/0087987 A1 | 7/2002 | Dudkiewicz et al. | |
| 2002/0097265 A1 | 7/2002 | Kurapati et al. | |
| 2002/0100046 A1 | 7/2002 | Dudkiewicz | |
| 2002/0104081 A1 | 8/2002 | Candelore et al. | |
| 2002/0104087 A1 | 8/2002 | Schaffer et al. | |
| 2002/0116710 A1 | 8/2002 | Schaffer et al. | |
| 2002/0120943 A1 | 8/2002 | Seto et al. | |

FOREIGN PATENT DOCUMENTS

| | | | |
|---|---|---|---|
| WO | 9107050 | 5/1991 | |
| WO | 91/07050 | 5/1991 | H04N/8/44 |
| WO | 9204801 | 3/1992 | |
| WO | 92/04801 | 3/1992 | H04N/5/76 |
| WO | 9531069 | 11/1995 | |
| WO | 95/31069 | 11/1995 | H04N/7/087 |
| WO | WO 96/33579 | 10/1996 | |
| WO | WO 96/37058 | 11/1996 | |
| WO | WO 97/06531 | 2/1997 | |
| WO | WO 97/17774 | 5/1997 | |
| WO | WO 97/27705 | 7/1997 | |
| WO | WO 97/29592 | 8/1997 | |
| WO | 97/48230 | 12/1997 | H04N/7/00 |
| WO | WO 97/50250 | 12/1997 | |
| WO | 9808192 | 2/1998 | |
| WO | WO 98/16062 | 4/1998 | |
| WO | WO 98/28869 | 7/1998 | |
| WO | WO 98/37696 | 8/1998 | |
| WO | WO 99/03275 | 1/1999 | |

OTHER PUBLICATIONS

Kageyama et al.; "A Free Time–Shift DVD Video Recorder" (IEEE Transactions on Consumer Electronics, Vol 43, No. 3, p. 469–73, Aug. 1997).

Kato et al.; "A Portable Communication Terminal for Novices and its User Interface Software" (IEICE Trans Commun., Vol E78–B, No. 10, pp. 1387–1393, Oct. 1995).

Maissel, John; "Double Agent Infopack: A Collection of Papers Relating to Phillip's Double Agent System" (May 1998).

Matsukura et al.; "Multimedia Notebook: Information Capturing Technologies for Portable Computers" (IEICE Trans Commun., vol. E78–B, No. 10, pp. 1381–1385, Oct. 1995).

Persoon, Eric H.J.; "Smash—a concept for advanced use of storage in the home" (presentation at IMAGINA '98, Mar. 4–6, 1998).

Petersen, Karin; "Tcl/Tk for a Personal Digital Assistant" (Usenix, Very High Languages Symposium Proceedings, pp 41–55, Oct. 26–28, 1994).

Zhang et al.; "Automatic parsing and indexing of news video" (Multimedia Systems 2:256–265, 1995).

Zhang et al.; "Automatic partitioning of a full–motion video" (Multimedia Systems 1:10–28, 1993).

"Applications for Home Storage Based Systems" (The Digital Audio–Visual Council, Bethesda, May 11–13, 1998, Source: Applications TC, DAVIC/TC/98/05/001).

"IBM Intelligent Agents" IBM Web Site/Materials collected from the world wide web, Sep. 24, 1996, p. 1–5, Address: www.raleigh.ibm.com/iag/iaghome.html.

"IBM Intelligent Agents" "The role of intelligent agents in the information infrastructure," IBM web site/Materials collected from the world wide web, Sep. 24, 1996, p. 1–11, address: www.raleigh.ibm.com/iag/iagtc2.html.

F. Cheong, Internet Agents: Spiders, wanderers, brokers, and "bot," New Riders Publishing, Copyright 1996, Chapter One, "The Worlds of Agents," p. 4–35 and bibliography.

* cited by examiner

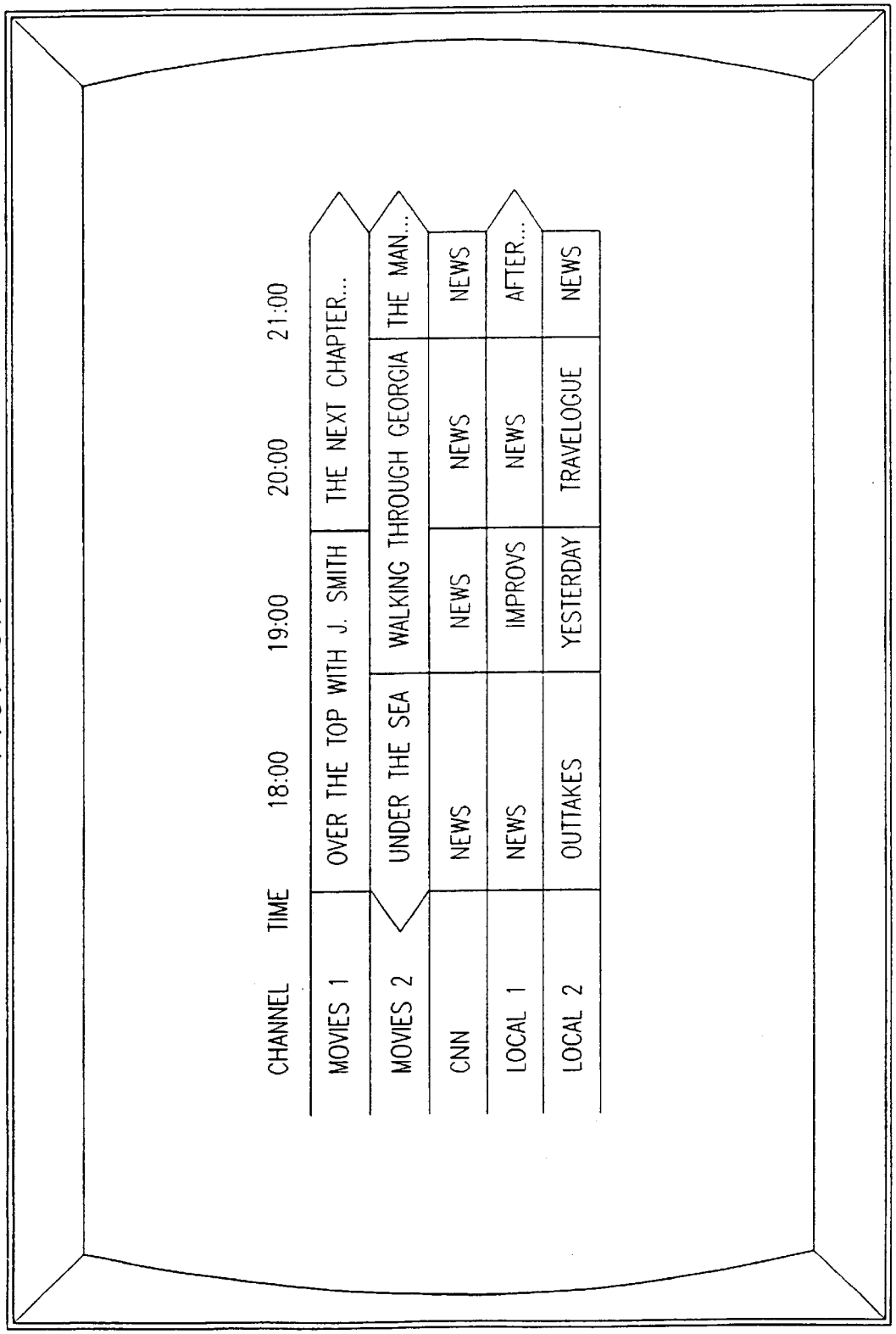

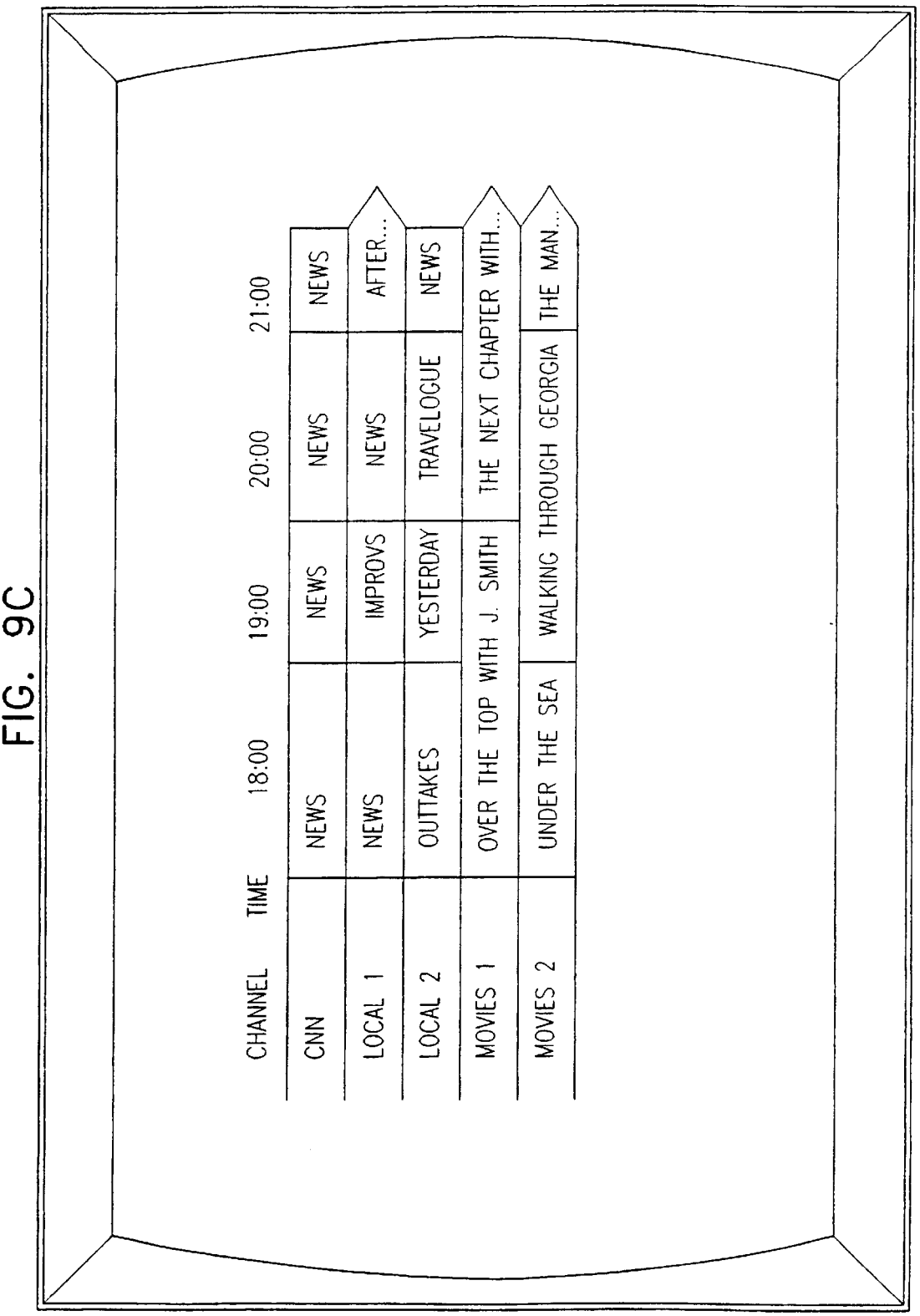

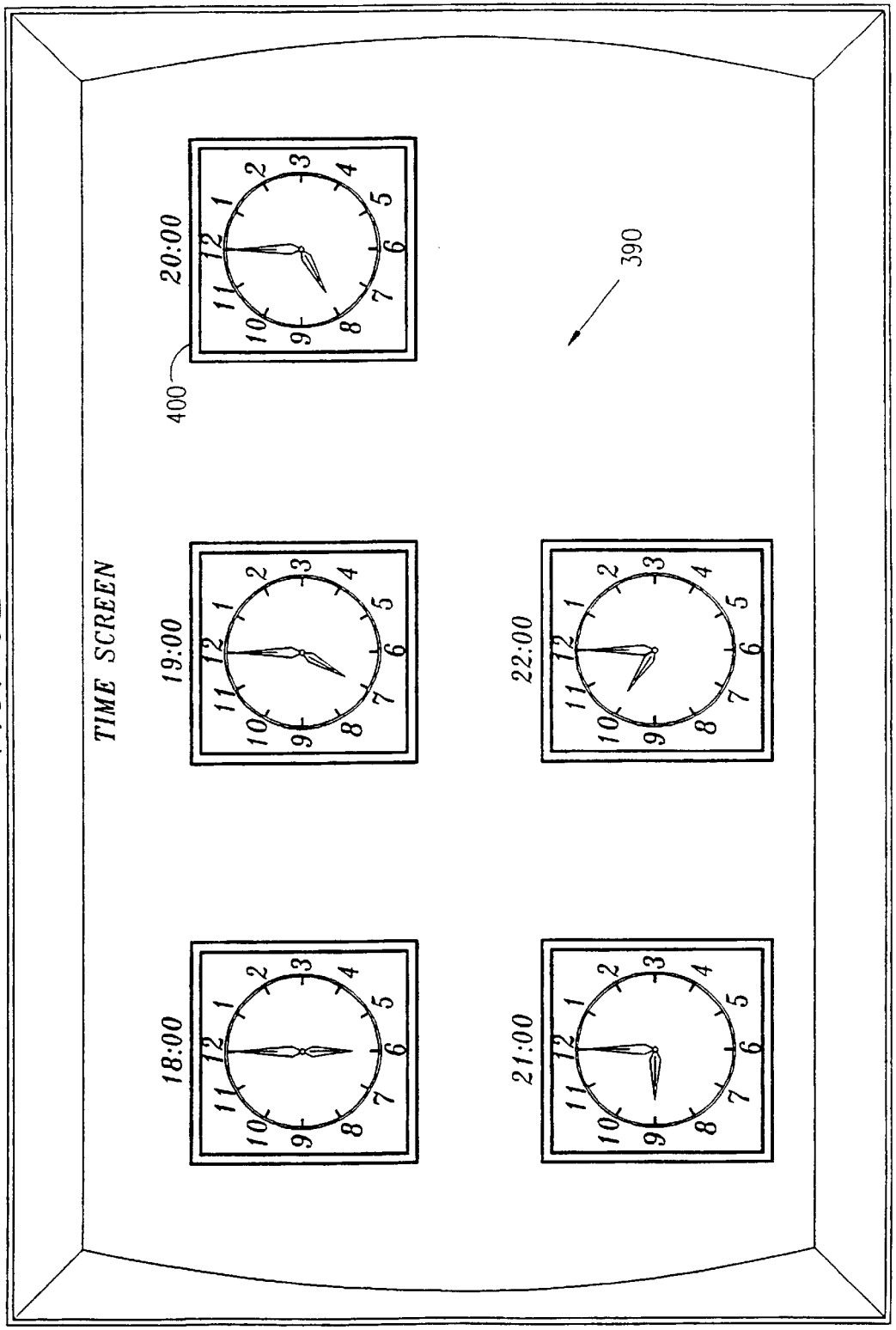

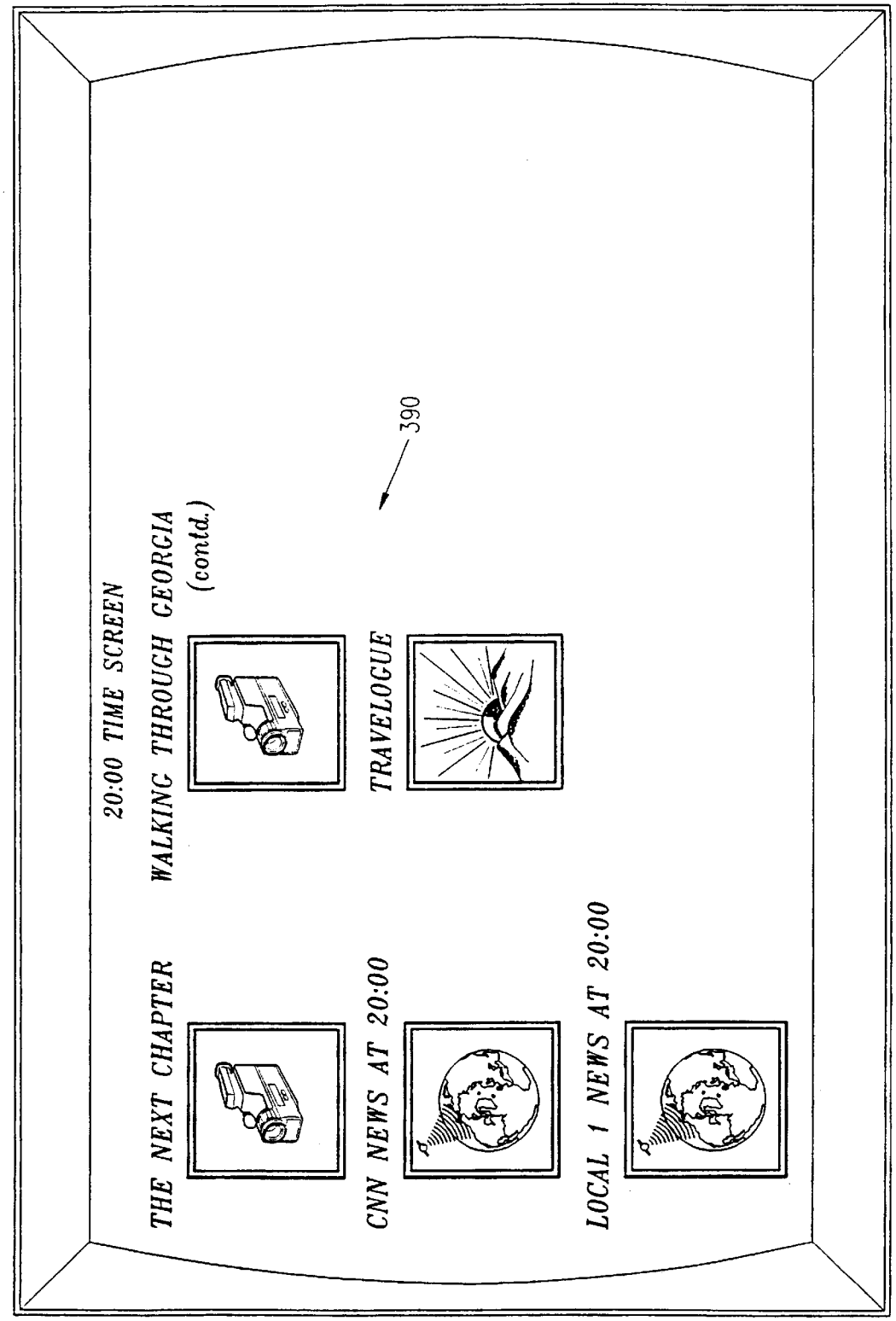

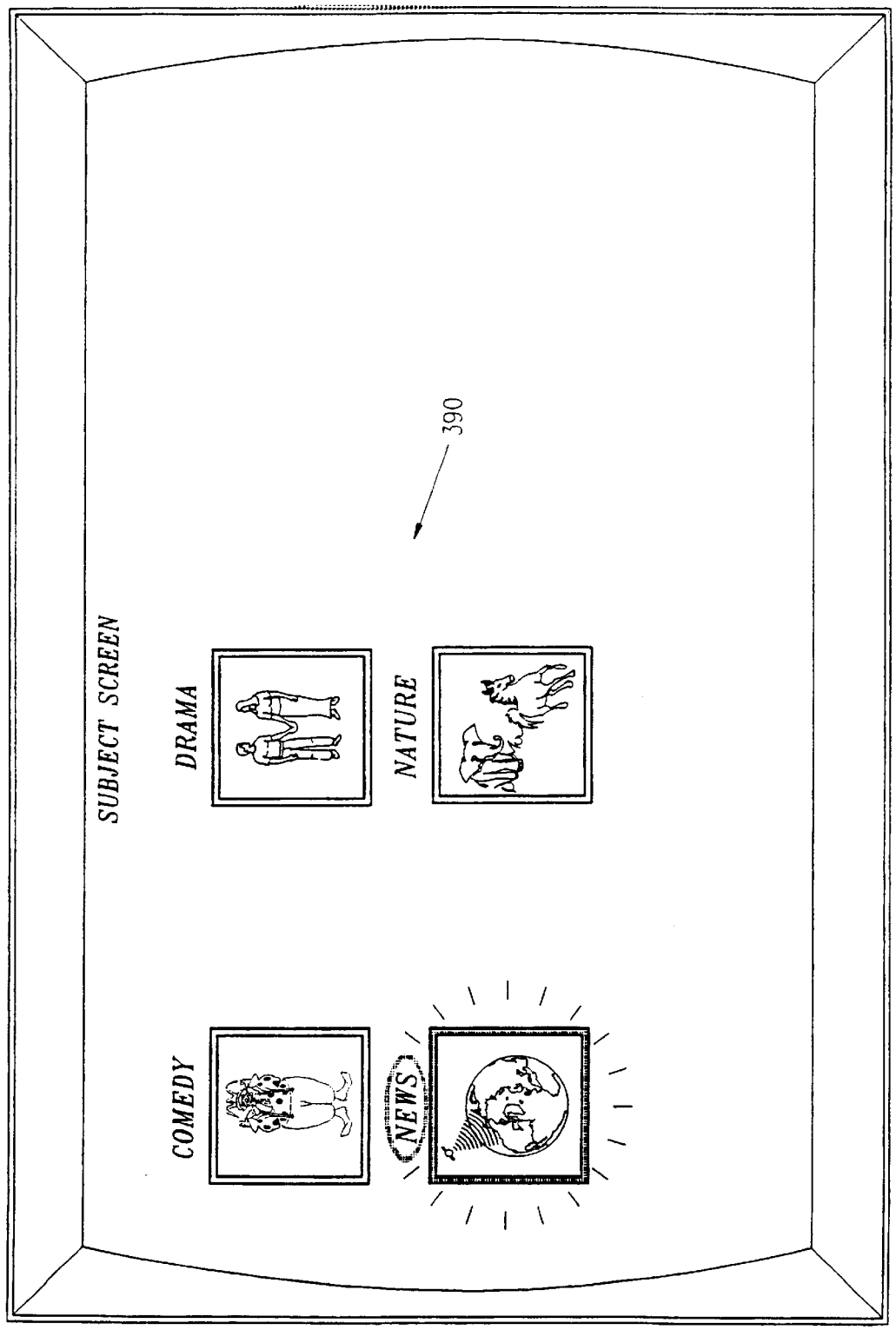

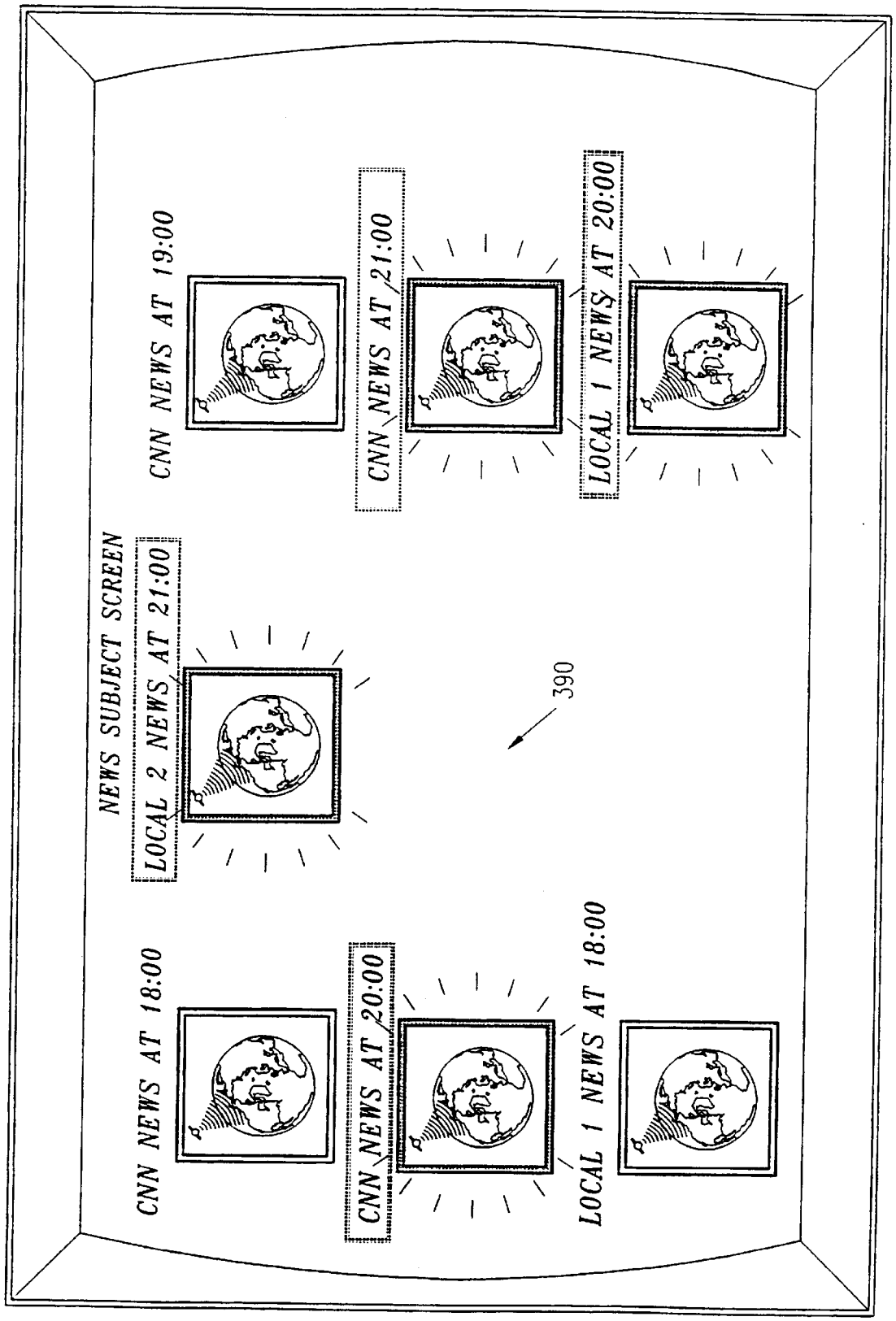

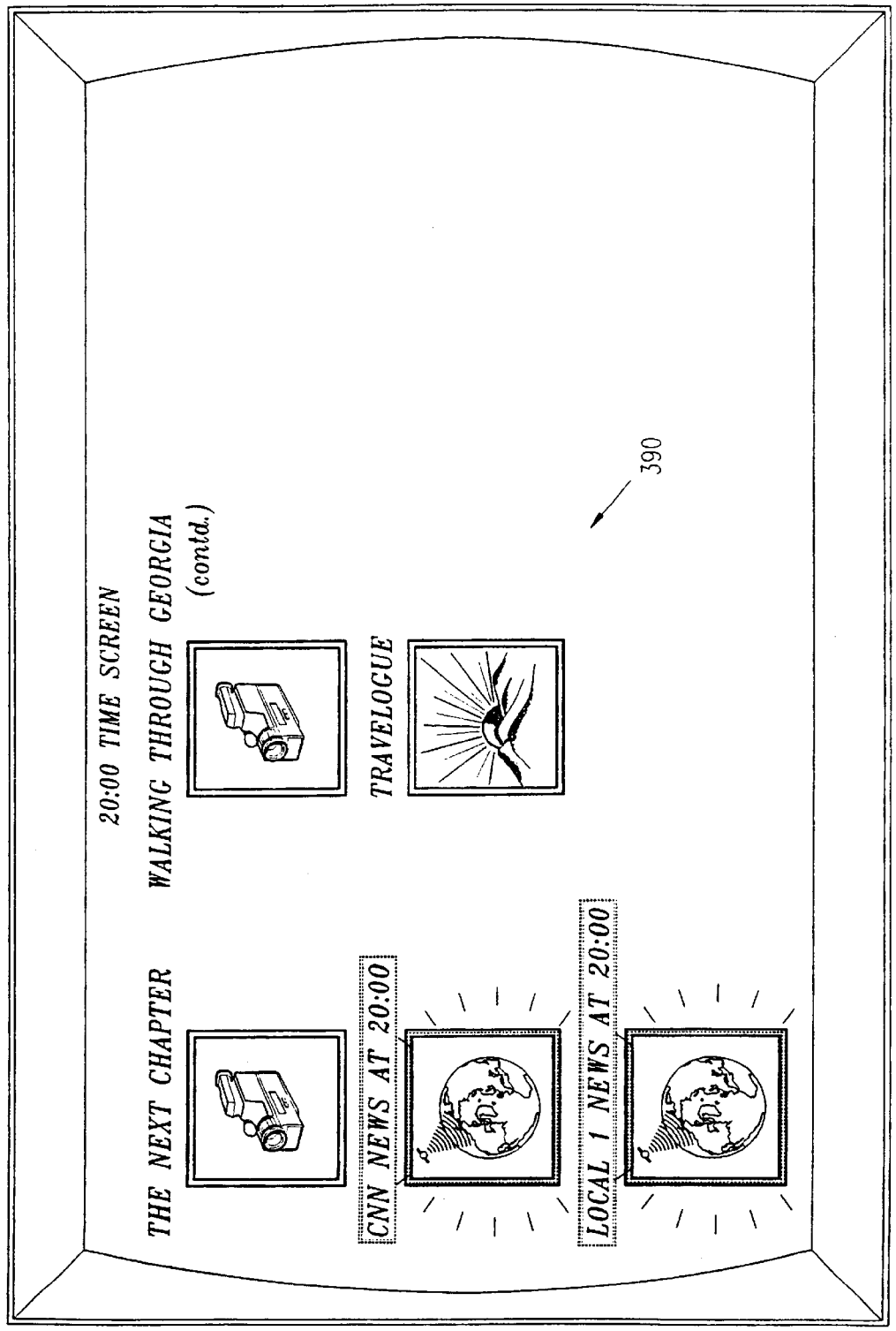

INTELLIGENT ELECTRONIC PROGRAM GUIDE

The present application is a 371 submission of PCT/IL98/00307, filed on Jun. 30, 1998 and entitled Intelligent Electronic Program Guide, which was published on Jan. 14, 1999 with International Publication No. WO 99/01984.

FIELD OF THE INVENTION

The present invention relates to television systems in general, and in particular to electronic program guides for television systems.

BACKGROUND OF THE INVENTION

Electronic program guides are well-known in the art. Electronic program guides provide television program schedule information on the television screen. Typically, electronic program guides display a rectangular grid schedule on the television screen, and allow the viewer to navigate through the schedule and to perform a variety of functions for one or more programs appearing on the schedule. Typical prior art program guides and related technologies are described in the following patents and published applications:

U.S. Pat. No. 4,706,121 to Young and Reexamination Certificate B1 4,706,121 to Young;

U.S. Pat. No. 4,977,455 to Young;

U.S. Pat. No. 5,038,211 to Hallenbeck;

U.S. Pat. No. 5,151,789 to Young;

U.S. Pat. No. 5,323,240 to Amano et al.;

U.S. Pat. No. 5,353,121 to Young et al.;

U.S. Pat. No. 5,444,499 to Saitoh

U.S. Pat. No. 5,479,266 to Young et al.;

U.S. Pat. No. 5,479,268 to Young et al.;

U.S. Pat. No. 5,515,106 to Chaney et al.;

U.S. Pat. No. 5,524,195 to Clanton, III et al.;

U.S. Pat. No. 5,550,576 to Klosterman;

U.S. Pat. No. 5,564,088 to Saitoh;

PCT published application WO 90/00847, assigned to Insight Telecast, Inc.;

PCT published application WO 91/07050, assigned to Insight Telecast, Inc.;

PCT published application 92/04801, assigned to Insight Telecast, Inc.; and

PCT published application WO 95/31069, assigned to Starsight Telecast, Inc.

Customization of program guide information based on information explicitly entered by a viewer is known in the art and is described, for example, in U.S. Pat. No. 5,479,266 and 5,479,268, mentioned above Customization of program guide information based on the channel watched and time watched is described in the following U.S. Pat. Nos. 5,323, 240; 5,444,499; and 5,564,088.

Broadcast methods of interest in the field of the present invention are described in DVB standard ETS 300-468.

The terms "agent" and "intelligent agent" are used interchangeably throughout the present specification and claims to refer to any machine-based assistant, including but not limited to a machine-based assistant implemented in software, with authority delegated from the user or users of the agent. Specifically, the terms "agent" and "intelligent agent", as used herein, are not limited to agents used by a particular person and may include agents used by one person or a plurality of people, whether used in a domestic, commercial, or other context.

Intelligent agents are both in use and proposed for future use in computer systems, particularly computer systems connected to an internetwork such as the Internet. Publications describing the intelligent agent prior art and proposals for the future use of intelligent agents include the following:

1. Fah-Chun Cheong, *Internet Agents: Spiders. Wanderers, Brokers, and 'Bots*, published by New Riders Publishing, 1996, describes the state of the art in agents in general and in Internet agents in particular. Chapter 1, pages 3–35 and the bibliography thereto on pages 387–390 are particularly relevant to the agent prior art. On page 9, Cheong describes surrogate bots, which are agents to "relieve users of low-level administrative and clerical tasks, such as setting up meetings, sending out papers, locating information, tracking whereabouts of people, and so on." Cheong gives the example of a visitor scheduling bot whose purpose is to assist in scheduling the visitors of the user of the bot.

On page 19, Cheong describes learning agents, a type of personal agent envisioned in the future for which "learning about the particular user's habits and goals, and tailoring to them accordingly" is the essential principle of operation. As an example of a learning agent, Cheong gives a calendar apprentice which helps a user organize the user's meeting schedule.

2. A World Wide Web Document found on the Internet at www.raleigh.ibm.com/iag/iaghome.html describes intelligent agents in general and IBM intelligent agents in particular. A copy of the document was obtained from the Internet on Sept. 24, 1996 at 2:14 PM.

3. A World Wide Web Document found on the Internet at www.raleigh.ibm.comiiag/iagptc2.html, entitled "The Role of Intelligent Agents in the Information Infrastructure", describes various application areas that intelligent agents can enhance. In section 3.8, Adaptive User Interfaces, mention is made that "agent technology allows systems to monitor the user's actions, develop models of user abilities, and automatically help out when problems arise." The document neither describes nor suggests the use of intelligent agents to customize an electronic program guide or any similar system component. A copy of the document was obtained from the Internet on Sep. 24, 1996 at 2:16 PM.

The above-mentioned prior art does not appear to describe or suggest the use of intelligent agents in any of the following contexts: in television systems; with a program guide in any context; or with an entity similar to a program guide in a computer system.

The disclosures of all references mentioned above and throughout the present specification are hereby incorporated herein by reference.

SUMMARY OF THE INVENTION

The present invention seeks to provide an improved electronic program guide for use in a television system. Throughout the present specification and claims, the term "television system" is used in a broad sense to include all types of television systems, including but not limited to any one or combination of the following: one-way systems; two-way systems; Systems utilizing cable communication networks, satellite communication networks, telephone communication networks, other communication networks, or any combination thereof, and CATV systems. Particularly, both pay television systems and non-pay or free television systems are included in the term "television system".

The present invention provides for customization of an electronic program guide by an intelligent agent. Typically, the intelligent agent monitors viewing behavior of one viewer or a plurality of viewers and creates a preference profile based on the monitored viewing behavior. The intelligent agent then preferably employs the preference profile to customize the electronic program guide based on the preference profile.

There is thus provided in accordance with a preferred embodiment of the present invention a television system including a television network, and transmitting apparatus for transmitting program schedule information to a multiplicity of subscriber units, at least one of the multiplicity of subscriber units including a receiving unit for receiving the program schedule information from the television network, a profile storage unit for storing at least one viewer preference profile of at least one television viewer, an intelligent agent for customizing the program schedule information based, at least in part, on the viewer preference profile, to produce a program guide including customized program schedule information, and display apparatus for displaying the program guide.

There is also provided in accordance with another preferred embodiment of the present invention a subscriber unit for use in a television system including a television network and transmitting apparatus for transmitting program schedule information, the subscriber unit including a receiving unit for receiving the program schedule information, a profile storage unit for storing at least one viewer preference profile of at least one television viewer, an intelligent agent for customizing the program schedule information based, at least in part, on the viewer preference profile, to produce a program guide including customized program schedule information, and display apparatus for displaying the program guide.

There is also provided in accordance with another preferred embodiment transmitting apparatus for transmitting program schedule information to a multiplicity of subscriber units, the transmitting apparatus including a headend, the headend including a profile storage unit for storing at least one viewer preference profile of at least one television viewer associated with one of the multiplicity of subscriber units, and an intelligent agent for customizing the program schedule information based, at least in part, on the viewer preference profile, to produce customized program schedule information, wherein the transmitting apparatus is operative to transmit the customized program schedule information to the one of the multiplicity of subscriber units, and at least one of the multiplicity of subscriber units includes a receiving unit for receiving the customized program schedule information from the television network, and display apparatus for displaying a program guide including the customized program schedule information.

There is also provided in accordance with another preferred embodiment of the present invention a headend for use in a television system including a television network and transmitting apparatus for transmitting customized program schedule information to at least one subscriber unit, the headend including a profile storage unit for storing at least one viewer preference profile of at least one television viewer associated with the at least one subscriber unit, and an intelligent agent for customizing the program schedule information based, at least in part, on the viewer preference profile, to produce customized program schedule information.

Further in accordance with a preferred embodiment of the present invention the transmitting apparatus includes network transmitting apparatus for transmitting over the television network.

Still further in accordance with a preferred embodiment of the present invention the transmitting apparatus includes recording apparatus for recording information on a removable medium, and means for sending the removable medium to a subscriber location including the subscriber unit, and the subscriber unit includes loading apparatus for loading the information from the removable medium into the subscriber unit.

Additionally in accordance with a preferred embodiment of the present invention the intelligent agent also includes profile determination apparatus for determining viewer preference profile information for at least one television viewer and for providing the viewer preference profile information to the profile storage unit for storage as a viewer preference profile, and the profile determination apparatus determines the viewer preference profile information by monitoring television viewing behavior of the at least one television viewer.

Moreover in accordance with a preferred embodiment of the present invention the television viewing behavior includes viewing at least a portion of at least one viewed television program.

Further in accordance with a preferred embodiment of the present invention the television viewing behavior includes the television viewer viewing only a portion of at least one viewed television program.

Still further in accordance with a preferred embodiment of the present invention the profile determination apparatus compares a length of the portion of the at least one viewed television program to a predetermined viewing threshold length to determine whether the length is greater than the threshold length, and the profile determination apparatus determines the viewer preference profile information based, at least in part, on whether the length is greater than the threshold length.

Additionally in accordance with a preferred embodiment of the present invention when the length is determined to be less than the threshold length, the profile determination apparatus determines the viewer preference profile information without regard to the viewing only a portion of the at least one television program.

Moreover in accordance with a preferred embodiment of the present invention when the portion is determined to be less than the threshold, the profile determination apparatus determines that the viewer is engaged in channel surfing behavior, and the profile determination apparatus determines the viewer preference profile information based, at least in part, on the channel surfing behavior.

Further in accordance with a preferred embodiment of the present invention the program schedule information includes a first plurality of criteria, at least one of the first plurality of criteria being associated with each of a second plurality of television programs, and the profile determination apparatus determines the viewer preference profile information based, at least in part, on at least one of the plurality of criteria associated with the at least one viewed television program.

Still further in accordance with a preferred embodiment of the present invention the profile determination apparatus determines the viewer preference profile information, at least in part, in accordance with input provided by the at least one television viewer.

Additionally in accordance with a preferred embodiment of the present invention the profile determination apparatus determines viewer preference profile information from a reaction of the at least one television viewer to previously displayed customized program schedule information.

Moreover in accordance with a preferred embodiment of the present invention each the viewer preference profile includes a viewer preference profile of exactly one viewer.

Further in accordance with a preferred embodiment of the present invention at least one the viewer preference profile includes a viewer preference profile of a plurality of viewers.

Still further in accordance with a preferred embodiment of the present invention the apparatus also includes viewer preference profile loading apparatus for providing a recorded viewer preference profile to the profile storage unit for storage.

Additionally in accordance with a preferred embodiment of the present invention the viewer preference profile loading apparatus receives the recorded viewer preference profile via the television network.

Moreover in accordance with a preferred embodiment of the present invention the viewer preference profile loading apparatus receives the viewer preference profile from profile storage apparatus located remotely thereto.

Further in accordance with a preferred embodiment of the present invention the customizing includes emphasizing at least a portion of the customized program schedule information based, at least in part, on the viewer preference profile.

Still further in accordance with a preferred embodiment of the present invention the customizing includes deemphasizing at least a portion of the customized program schedule information based, at least in part, on the viewer preference profile.

Additionally in accordance with a preferred embodiment of the present invention the customizing includes tailoring a custom channel based, at least in part, on the viewer preference profile.

Moreover in accordance with a preferred embodiment of the present invention the customizing includes automatically tuning to a program selected based, at least in part, on the viewer preference profile.

Further in accordance with a preferred embodiment of the present invention the customizing includes automatically recording, on recording apparatus, a program selected based, at least in part, on the viewer preference profile.

Still further in accordance with a preferred embodiment of the present invention the customizing includes ordering at least some of the customized program schedule information based, at least in part, on the viewer preference profile.

Additionally in accordance with a preferred embodiment of the present invention the display apparatus is operative to display an on-screen alert including at least part of the customized program schedule information.

Moreover in accordance with a preferred embodiment of the present invention the alert includes an unsolicited alert.

Further in accordance with a preferred embodiment of the present invention the unsolicited alert includes audience viewing information including an indication of a proportion of an audience currently viewing a program.

Still further in accordance with a preferred embodiment of the present invention the program includes a program currently being viewed by a viewer.

Additionally in accordance with a preferred embodiment of the present invention the program includes a program not currently being viewed by a viewer.

Further in accordance with a preferred embodiment of the present invention the display apparatus displays the on-screen alert a predetermined period of time before a scheduled starting time of a television program, the at least part of the customized program schedule information including information associated with the television program.

Still further in accordance with a preferred embodiment of the present invention the customizing includes displaying an indication of a proportion of an audience currently viewing a program.

Additionally in accordance with a preferred embodiment of the present invention the proportion of an audience includes a proportion of an audience viewing a program currently being viewed by a viewer.

Further in accordance with a preferred embodiment of the present invention the proportion of an audience includes a proportion of an audience viewing a program not currently being viewed by a viewer.

Still further in accordance with a preferred embodiment of the present invention the display apparatus includes an icon-based guide generator for producing an icon-based hierarchical program guide including the program schedule information, and the program guide includes the icon-based hierarchical program guide. The term "icon", as used throughout the present specification and claims, is used in the sense commonly accepted in the art of computer programming, particularly computer interface design, to refer to a small picture, photograph, or other representation which is meant to pictorially recall to the user a function or functions associated therewith.

There is also provided in accordance with another preferred embodiment of the present invention a television system including a television network, and transmitting apparatus for transmitting program schedule information to a multiplicity of subscriber units, each subscriber unit including a receiving unit for receiving the program schedule information from the television network, an icon-based guide generator for producing a program guide including an icon-based hierarchical program guide including the program schedule information, and display apparatus for displaying the program guide.

There is also provided in accordance with another preferred embodiment of the present invention a subscriber unit for use in a television system including a television network and transmitting apparatus for transmitting program schedule information, the subscriber unit including a receiving unit for receiving the program schedule information from the television network, an icon-based guide generator for producing a program guide including an icon-based hierarchical program guide including the program schedule information, and display apparatus for displaying the program guide.

There is also provided in accordance with another preferred embodiment of the present invention a method for providing a program guide in a television system, the method including providing a television network, and transmitting program schedule information to a multiplicity of subscriber units, each subscriber unit performing the following steps receiving the program schedule information from the television network, storing at least one viewer preference profile of at least one television viewer, employing an intelligent agent to customize the program schedule information based, at least in part, on the viewer preference profile, to produce a program guide including customized program schedule information, and displaying the program guide.

There is also provided in accordance with another preferred embodiment of the present invention a method for providing a program guide in a television system including a television network and transmitting apparatus for transmitting program schedule information, the method including receiving the program schedule information, storing at least one viewer preference profile of at least one television viewer, employing an intelligent agent to customize the program schedule information based, at least in part, on the viewer preference profile, to produce a program guide including customized program schedule information, and displaying the program guide.

There is also provided in accordance with another preferred embodiment of the present invention a method for providing a program guide in a television system, the method including providing a television network, and transmitting program schedule information to a multiplicity of subscriber units, wherein the step of transmitting includes storing at least one viewer preference profile of at least one television viewer associated with one of the multiplicity of subscriber units, employing an intelligent agent to customize the program schedule information based, at least in part, on the viewer preference profile, to produce customized program schedule information, transmitting the customized program schedule information to the one of the multiplicity of subscriber units, receiving, at the one of the multiplicity of subscriber units, the customized program schedule information from the television network, and displaying a program guide including the customized program schedule information.

There is also provided in accordance with another preferred embodiment of the present invention a method for providing a program guide in a television system including a television network and transmitting apparatus for transmitting customized program schedule information, the method including storing at least one viewer preference profile of at least one television viewer associated with one of the multiplicity of subscriber units, and customizing the program schedule information based, at least in part, on the viewer preference profile, to produce customized program schedule information.

There is also provided in accordance with another preferred embodiment of the present invention a method for providing a program guide in a television system, the method including providing a television network, and transmitting program schedule information to a multiplicity of subscriber units, each subscriber unit performing the following steps receiving the program schedule information, producing a program guide including an icon-based hierarchical program guide including the program schedule information, and displaying the program guide.

There is also provided in accordance with another preferred embodiment of the present invention a method for providing a program guide in a television system including a television network and transmitting apparatus for transmitting program schedule information, the method including receiving the program schedule information, producing a program guide including an icon-based hierarchical program guide including the program schedule information, and displaying the program guide.

There is also provided in accordance with another preferred embodiment of the present invention a headend for use in a television system including a television network and transmitting apparatus for transmitting customized program schedule information to a multiplicity of subscriber units, the transmitting apparatus including the headend, the headend including a profile creation unit for creating at least one viewer preference profile of at least one television viewer associated with one of the multiplicity of subscriber units, based on viewer information associated with the one of the multiplicity of subscriber units, and a transmission unit for transmitting the at least one viewer preference profile to the one of the multiplicity of subscriber units.

There is also provided in accordance with another preferred embodiment of the present invention a method for providing a program guide in a television system including a television network and transmitting apparatus for transmitting customized program schedule information to a multiplicity of subscriber units, the method including creating at least one viewer preference profile of at least one television viewer associated with one of the multiplicity of subscriber units, based on viewer information associated with the one of the multiplicity of subscriber units, and transmitting the at least one viewer preference profile to the one of the multiplicity of subscriber units.

There is also provided in accordance with another preferred embodiment of the present invention a method for providing a viewer preference profile in a television system including a plurality of subscriber units, the method including recording, at a first subscriber unit, a viewer preference profile on a removable medium, loading, at a second subscriber unit, the viewer preference profile from the recording medium, and customizing a program guide, at the second subscriber unit, based, at least in part, on the viewer preference profile.

There is also provided in accordance with another preferred embodiment of the present invention a method for providing audience information to a viewer of a television system, the method including collecting viewing data from a multiplicity of viewers of a television system, computing audience information from the collected viewing data, and transmitting the computed audience information to a viewer of the television system.

Further in accordance with a preferred embodiment of the present invention the method also includes displaying the computed audience information to the viewer of the television system.

Still further in accordance with a preferred embodiment of the present invention the computed audience information comprises real-time computed audience information.

There is also provided in accordance with another preferred embodiment of the present invention a method for providing a program guide in a television system comprising a television network and transmitting apparatus for transmitting information to a multiplicity of subscriber units, the method including creating at least one viewer preference profile of at least one television viewer associated with one of the multiplicity of subscriber units, based on viewer information associated with the one of the multiplicity of subscriber units, creating a customized program guide based, at least in part, on the at least one viewer preference profile, and transmitting the customized program guide to the one of the multiplicity of subscriber units.

Further in accordance with a preferred embodiment of the present invention the transmitting step includes transmitting via at least one of the following: conventional mail, electronic mail, provision of a World Wide Web site comprising said customized program guide, and wireless transmission to a portable electronic receiving device.

Still further in accordance with a preferred embodiment of the present invention the icon-based hierarchical program guide includes a plurality of icons, and at least one of the plurality of icons is associated with additional information, the additional information being provided to a user upon request.

Additionally in accordance with a preferred embodiment of the present invention the additional information includes at least one of the following: audio material; visual material; audio-visual material; multimedia material; a computer program; and at least one preview of at least one program.

Moreover in accordance with a preferred embodiment of the present invention the additional information includes a plurality of customized items of information, and at least one of the plurality of customized items of information is provided to the user based, at least in part, on at least one of the following: a user preference; a conditional access parameter; and a region in which said user is located.

BRIEF DESCRIPTION OF THE DRAWINGS

The present invention will be understood and appreciated more fully from the following detailed description, taken in conjunction with the drawings in which:

FIGS. 9A–9L are simplified pictorial representations of preferred embodiments of an electronic program guide, which may be displayed on the display of FIG. 1, FIG. 8A, or FIG. 8B.

DETAILED DESCRIPTION OF A PREFERRED EMBODIMENT

Figure 1:
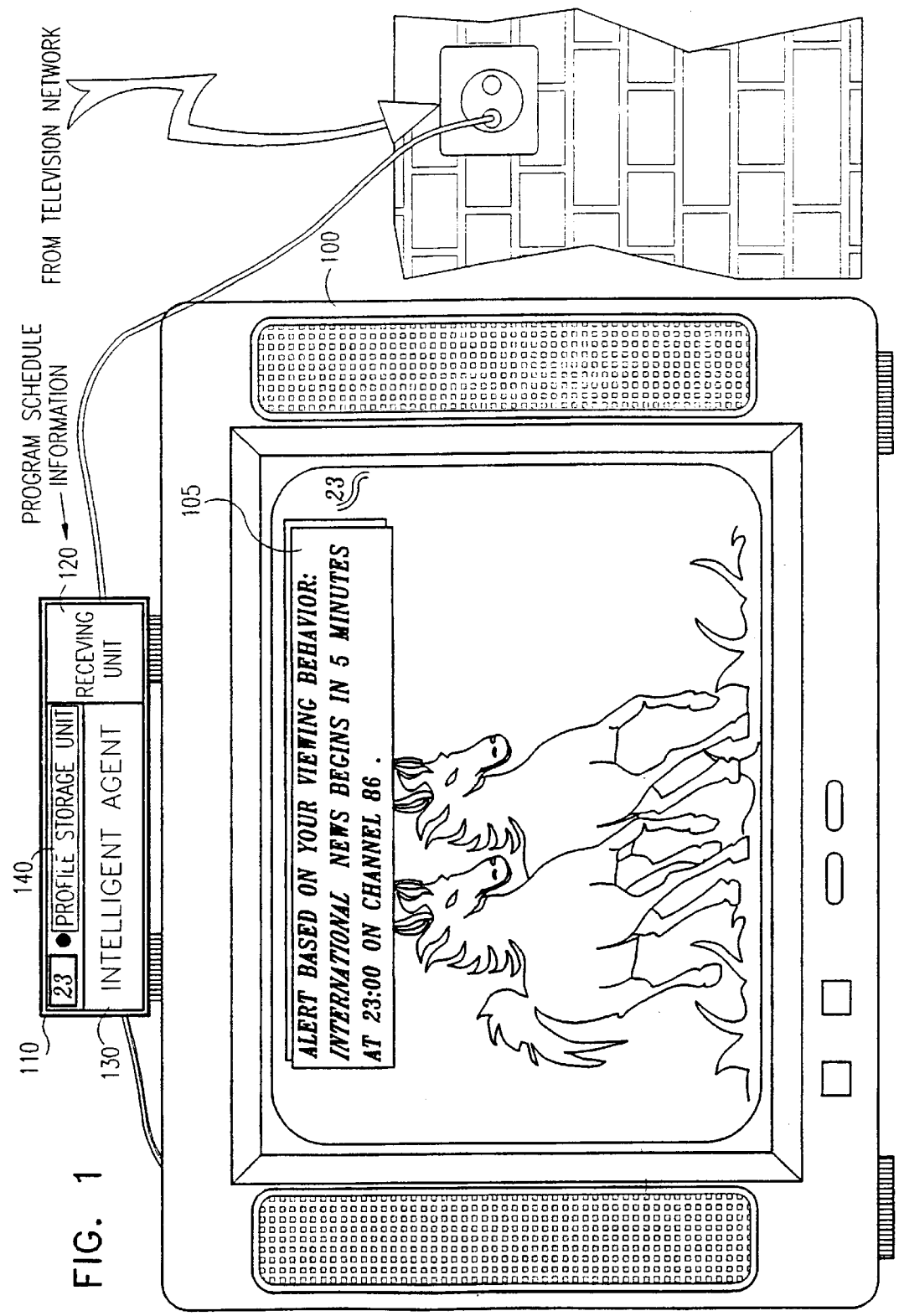
FIG. 1 is a simplified partly pictorial, partly block diagram illustration of a television system comprising a subscriber unit constructed and operative in accordance with a preferred embodiment of the present invention.

Reference is now made to FIG. 1 which is a simplified partly pictorial, partly block diagram illustration of a television system comprising a subscriber unit constructed and operative in accordance with a preferred embodiment of the present invention. The apparatus of FIG. 1 comprises display apparatus 100 for display of an electronic program guide, the display apparatus 100 typically comprising a television set as shown in FIG. 1. The television set may comprise any suitable commercially available television set.

It is appreciated that the display apparatus 100 may alternatively comprise any other suitable display apparatus such as, for example, a computer display, another suitable display, or suitable projection equipment, as is well known in the art. In a case where a display other than a television set is used, it is appreciated that a television set is typically provided separately. For the purpose of simplicity in description, a case where the display apparatus 100 comprises a television set is generally described throughout the present specification, but it is appreciated that another type of appropriate display apparatus may generally be used.

On the display apparatus 100 an on-screen alert 105 is shown. The on-screen alert 105 is described more fully below. The on-screen alert 105 is shown as an example of a component of an electronic program guide, as described below. It is appreciated that the electronic program guide may take a wide variety of forms and that, typically, the on-screen alert 105 is comprised in the electronic program guide and that the electronic program guide may comprise other components alternatively, or in addition to, the on-screen alert 105.

The apparatus of FIG. 1 also comprises an interface unit 110. The interface unit 110 is also known as a set top box (STB). The interface unit 110 is operative to provide a least a one-way interface, and optionally a two-way interface, between the display apparatus 100 and a television network, which may be either a pay television network or a non-pay or free television network. It is appreciated that, in certain preferred embodiments of the present invention such as, for example, the embodiments of FIGS. 8A and 8B, described below, a two-way interface is preferable. The interface unit 110 typically comprises a variety of conventional STB components (not shown), as is well known in the art, to receive, tune and, as necessary, decode television broadcasts received from the television network and to send display signals representing the received broadcasts to the display apparatus 100.

The interface unit 110 also typically comprises a receiving unit 120, an intelligent agent 130, and a profile storage unit 140, the receiving unit 120 and the profile storage unit 140 being operatively attached to the intelligent agent 130. The receiving unit 120, the intelligent agent 130, and the profile storage unit 140 are typically implemented in software in one or more suitable microprocessors suitably equipped with memory, but it is appreciated that a hardware implementation may also be used. The functions of the receiving unit 120, the intelligent agent 130, and the profile storage unit 140 are described in more detail below. The apparatus of FIG. 1 may also comprise a recording device such as a VCR (not shown), or any other appropriate conventional recording device, including a DVCR (digital VCR) or DVD (digital video disc) recording device.

The operation of the apparatus of FIG. 1 is now briefly described. The interface unit 110 receives television broadcasts from the television network. A user of the apparatus of FIG. 1 chooses a channel to watch, using means well-known in the art such as, for example, a commercially-available remote control unit. The interface unit 110, responsive to the user's choice of channel, transmits display signals representing received broadcasts on the chosen channel to the display apparatus 100, as is well-known in the art.

As is well-known in the art, the television broadcasts typically also comprise television program schedule information. It is appreciated that program schedule information may alternatively or additionally be distributed by other non-broadcast methods such as, for example: by sending a removable medium to the user for insertion in an appropriate unit (not shown) for receiving the medium in the apparatus of FIG. 1; by publishing coded information, such as in a newspaper or magazine, and by providing equipment (not shown) for use with the apparatus of FIG. 1 to read the coded information into the apparatus of FIG. 1; or otherwise.

The terms "program schedule information" and "television program schedule information" are used interchangeably throughout the present specification and claims to refer to information describing a television program schedule. Program schedule information is typically intended to assist a television viewer in choosing a television program to watch, either at the current time or in the future. Program schedule information typically comprises one or more of the following:

- channel number;
- starting date;
- starting time;
- ending date;
- ending time;
- name of program;
- description of program;
- name of at least one actor in program;
- name of director of program;
- program provider;
- price of program; and
- classification criteria.

The classification criteria may typically comprise one or more of the following: indications of whether the program is a comedy, a drama, a documentary, a news program, etc.; an indication of whether the program contains material unsuited for younger viewers; the country of origin of the program; and any other appropriate classification criteria. A typical example of such criteria is described in DVB standard ETS 300–468, referred to above.

Figure 2:
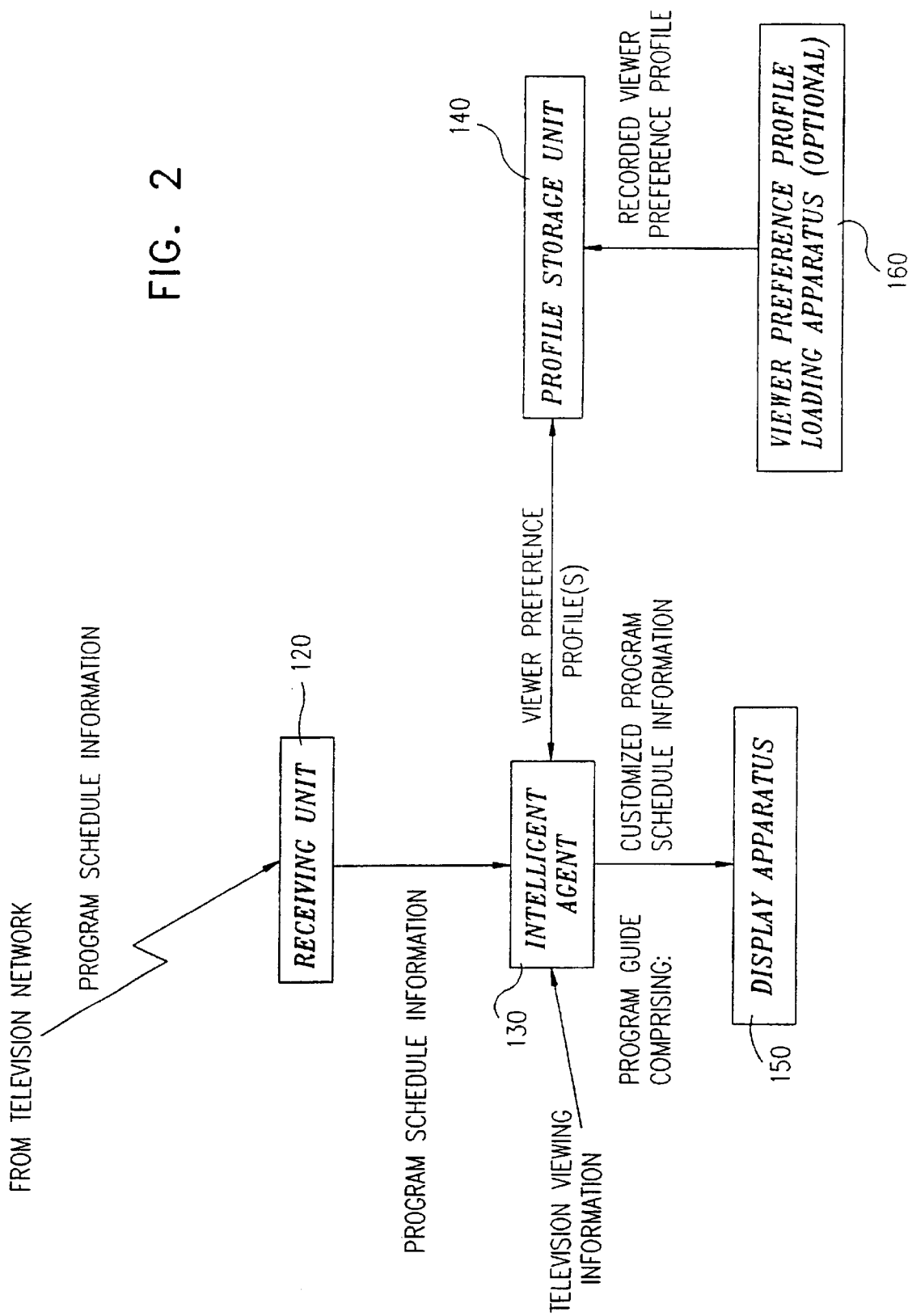
FIG. 2 is a simplified block diagram illustration of a portion of the apparatus of FIG. 1.

Reference is now additionally made to FIG. 2, which is a simplified block diagram illustration of a portion of the apparatus of FIG. 1. The apparatus of FIG. 2 comprises the receiving unit 120, the intelligent agent 130, the profile storage unit 140, and the display apparatus 150 of FIG. 2, and illustrates the connections therebetween as well as the inputs thereto and outputs therefrom. The apparatus of FIG. 2 also comprises an optional viewer preference profile loading apparatus 160 (not shown in FIG. 1), described below.

The receiving unit 120 is typically operative to receive the program schedule information from the television network and to pass the program schedule information to the intelligent agent 130. The receiving unit 120 may also be operative, as is well known in the art, to filter the program schedule information from other information broadcast via the television network, such as television programs, thus producing the information passed by the receiving unit 120 to the intelligent agent 130. The intelligent agent 130 also typically receives television viewing information representing current television viewing behavior of one or more individual viewers. The television viewing information, typically comprising an indication of the channel currently being watched and, optionally, viewer identification information, may be received from conventional components of the interface unit 110, as is well known in the art, or from another appropriate source.

It is appreciated that, in a case where the television viewing information comprises viewer identification information, the viewer identification information is typically obtained using methods well-known in the art for identifying viewers such as, for example, requiring one or more viewers to supply identifying information such as, for example, a personal identification number (PIN) before viewing television. Thus, the television viewing information may be associated with one or more viewers. It is also appreciated that, in a case where the television viewing information does not comprise viewer identification information the television viewing information is preferably taken to be general, that is, not to be associated with any particular viewer. For the sake of simplicity in description, a case where the television viewing information is associated with one or more viewers is generally described herein, but it is appreciated that the present invention also applies to the case where the television viewing information is not associated with any particular viewer.

The intelligent agent 130 is preferably operable to combine the television viewing information with the program schedule information and to extract therefrom characteristics, typically comprising components similar to those described above with respect to program schedule information, which characterize the television program currently being viewed by the viewer. Such components are also known herein as current program characteristics. The intelligent agent 130 is typically operative to store the current program characteristics in a viewer preference profile, typically in the profile storage unit 140, the viewer preference profile typically comprising information, obtained over a period of time, on the various current program characteristics of programs viewed by a viewer at various times. The period of time may be as short as a few minutes or as long as a year or more. The viewer preference profile also typically comprises information on the amount of time or proportion of duration of the program during which each program was viewed by the viewer.

Typically, the viewer preference profile may contain information on preference strength, that is, on how strongly a certain program or type of program is preferred by the viewer. Preference strength may reflect the number of times that the program was viewed in a given period of time, the percentage of all occurrences of the program that were viewed, or any other appropriate criterion. Typically, the viewer preference profile is accumulated over an unlimited amount of time. Alternatively, old information may be eliminated from the profile or the profile may be reset upon receipt of a signal from the television network.

Optionally, the apparatus of FIG. 1 may be operative to display a viewer preference profile on the display apparatus 100 or otherwise and to allow the viewer to edit or otherwise modify the viewer preference profile, typically using user interface methods well known in the art. In this case, the viewer is preferably enabled to add, delete, or modify any information in the viewer's viewer preference profile, it being appreciated that the apparatus of FIG. 1 is preferably operative to provide an appropriate questionnaire or other assisted data input method, as is well known in the art, in order to assist the viewer in adding, deleting, or modifying information. Particularly, the viewer is preferably enabled to provide information on programs or types of programs which the viewer prefers to view or prefers not to view. Furthermore, the viewer is preferably enabled to do one or more of the following:

- turn off or on the collection of viewer preference profile information;
- define different levels of highlighting, as described below;
- turn the delivery of alerts on or off;
- instruct the apparatus of FIG. 1 to include or not to include popular programs in the program guide;

instruct the apparatus of FIG. 1 to include or not to include programs having a certain rating, such as programs having a rating as unsuitable for children, in the program guide;

instruct the apparatus of FIG. 1 to include or not to include programs recommended by one or more critics in the program guide; and perform any other appropriate action.

As described below, the viewer preference profile stored by the intelligent agent 130 and used as described below may comprise a simple data structure describing current program characteristics of programs viewed by a viewer and other information as stated above. It is appreciated, however, that the viewer preference profile may, in alternative embodiments of the present invention, take a wide variety of forms. For example, without limiting the generality of the foregoing, the viewer preference profile may comprise one or more rules abstracted from at least the current program characteristics of programs viewed by a viewer, the extraction and/or abstraction of such rules from the current program characteristics of programs viewed by a viewer and other information as stated above being possible using methods well-known in the art, particularly methods in use with rule-based expert systems.

Such rules, as is well known in the art, may comprise conditions and results to be carried out if the conditions are true. For example, such a rule might state that if the user preference level for news is greater than a given threshold and if a news program is scheduled within the next 30 minutes, a news alert should be presented on the screen. For the sake of simplicity in description, the case of a simple data structure will generally be described below, it being appreciated that other methods, such as, for example, a rule-based method, may also be used.

The intelligent agent 130 is also operative to customize the program schedule information received from the receiving unit 120 in accordance with one or more viewer preference profiles belonging to one or more viewers and to output a program guide comprising the customized program schedule information to the display apparatus 150 for display. It is appreciated that, in a case where more than one viewer preference profile is used, the plurality of viewer preference profiles may be combined by any appropriate method, including simply combining the profiles, giving complete preference to one profile over another profile, giving partial preference to one profile over another profile, or by any other appropriate combining method.

The term "customize" in its various forms, as used throughout the present specification and claims with reference to program schedule information to be comprised in a program guide, is used generally to refer to any kind of customization including, for example, one or more of the following:

changing the order in which programs appear in the program guide;

changing the order in which channels appear in the program guide;

removing certain programs from or adding certain programs to the program guide, the added programs typically comprising programs that were not previously displayed due to another customization;

highlighting or emphasizing certain programs in the program guide, possibly including multiple levels of highlighting or emphasis;

de-highlighting or deemphasizing certain programs in the program guide, possibly including multiple levels of de-highlighting or de-emphasis;

modifying a hierarchy, such as, for example, an icon-based hierarchy, of programs in the program guide;

modifying the appearance of an element of the program guide such as, for example, an icon, including modifying an icon to be non-objectionable for viewing by children;

displaying an alert comprising program schedule information;

customizing a channel to contain selected programs from the program guide, typically by creating a virtual channel comprising, for example, a list of times and channels on which preferred programs are broadcast at those times, to give a viewer the appearance that the viewer's preferred programs are all broadcast on the customized channel;

delivering an alert remind the viewer to record a program;

automatically recording a program; and any other appropriate kind of customization.

It is appreciated that other factors in addition to a viewer preference profile may also be applied by the intelligent agent 130. Examples of such other factors and their typical use by the intelligent agent 130 include the following:

parental control information, which is well known in the art, may be used to eliminate certain programs from the program guide or to modify objectionable descriptions and/or icons so that they are suitable for viewing by children;

parental control or other information may be used to limit total viewing time or viewing during certain times of the day by removing programs falling outside the limitation from the program guide;

subscription information, typically including information on television services which have been subscribed to by a viewer, may be used to eliminate programs not subscribed for from the program guide;

rating information, typically including information on general viewer popularity of a program based on ratings as are well known in the art, may be used to modify the customization of the program guide, typically by including or promoting the importance of highly rated programs but possibly by excluding or reducing the importance of highly rated programs, and further possibly by modifying the viewer preference profile based on the rating information; and language choice information, typically including information on a preferred language, may be used to display listings in a particular language or for program versions in a particular language, it being appreciated that viewer preference profile information on language viewing preferences may override language choice information.

The optional viewer preference profile loading apparatus 160, if present, may be used to load a recorded viewer preference profile of another viewer, including a viewer who has used another apparatus, similar to that of FIG. 1, at a different time and place. Such a recorded viewer preference profile may be provided on any appropriate recording medium, may be broadcast via the television network, or may be delivered from profile storage apparatus by any appropriate means. It is appreciated that a recorded viewer preference profile may typically be a profile of a well-known person, may be intended to provide customization of the program guide in a way similar to that which would be provided to the famous person, and may be provided for a fee or other consideration. The effect of using such a recorded viewer preference profile would be, approximately, to receive a customized program guide customized according to the preferences of the person who is the source of the recorded viewer preference profile.

Alternatively, a recorded viewer preference profile could be used as an anti-profile in the sense that customization could occur opposite to what would be the result of using the recorded preference profile; that is, a particular program that was preferred according to the recorded viewer preference profile could be, for example, deemphasized.

Optionally, the profile loading apparatus 160, if present, may also be operative to record a viewer preference profile on any appropriate recording medium such as, for example, a diskette or an appropriate smart card. The recorded viewer preference profile may then be provided to another viewer having apparatus similar to that of FIG. 1 for loading as described above.

It is appreciated that the implementation of the present invention described above, wherein a program guide is transmitted to a television, comprises one particular implementation of the present invention, and that the scope of the present invention is not limited by the above-described implementation. In particular, it is appreciated that, with minor variations as is well known in the art, a customized program guide could be delivered to a viewer by, for example, one or more of the following methods:

conventional mail;
electronic mail, including conventional electronic mail, electronic mail delivered to a television, text-based electronic mail, graphics-based electronic mail, HTML-based electronic mail, or any other suitable type of electronic mail;
a personalized World Wide Web site on the Internet; and
wireless delivery to a portable electronic device such as a suitable beeper, palmtop device, personal organizer, watch, radio receiver, or any other suitable portable electronic device.

Figure 3:
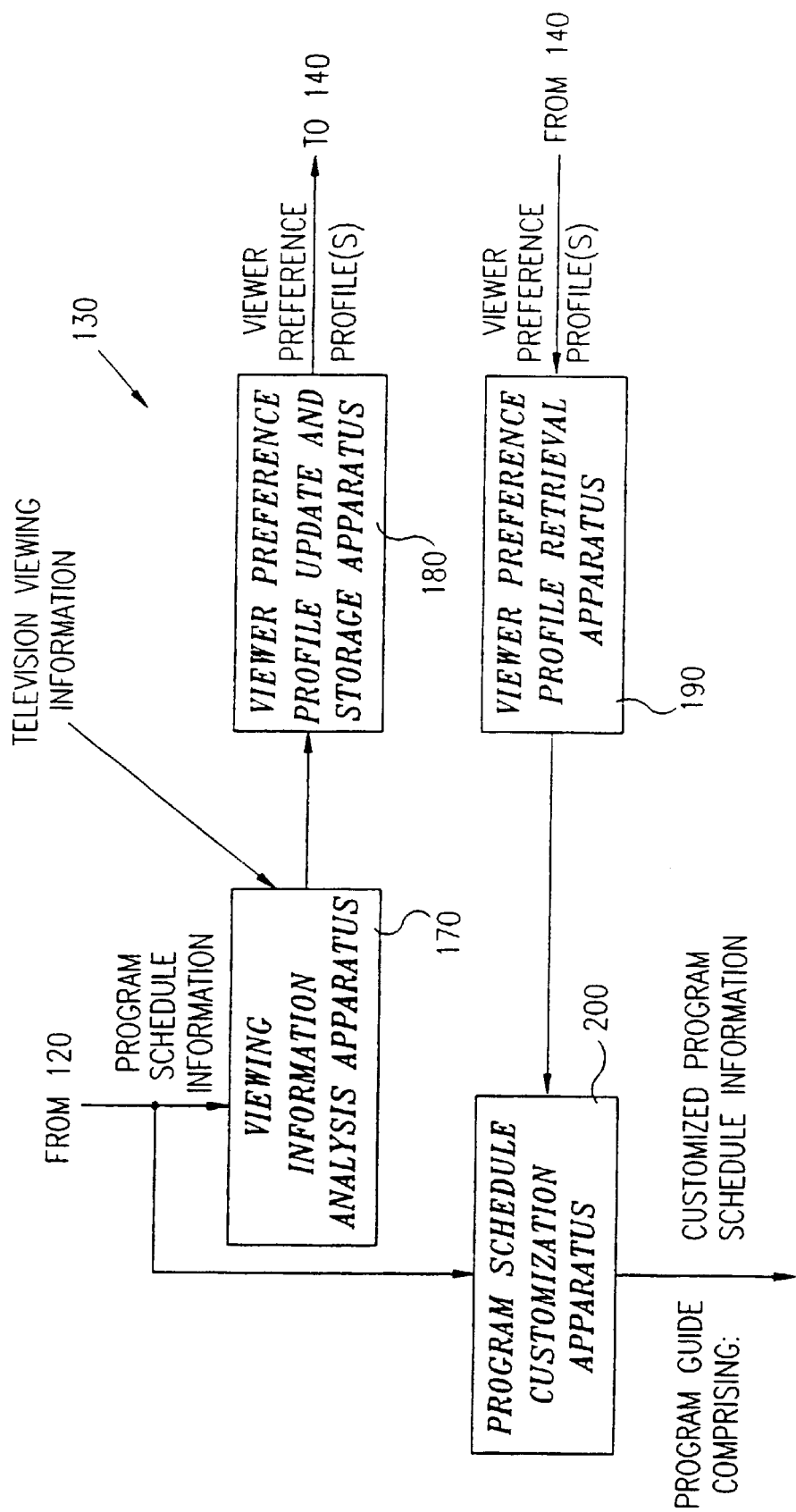
FIG. 3 is a simplified block diagram illustration of a preferred implementation of the intelligent agent of FIG. 2.

Reference is now made to FIG. 3, which is a simplified block diagram illustration of a preferred implementation of the intelligent agent 130 of FIG. 2. The apparatus of FIG. 3 preferably comprises viewing information analysis apparatus 170, which typically receives program schedule information from the receiving unit 120 of FIG. 2, as described above, as well as receiving television viewing information, as described above with reference to FIG. 2.

The apparatus of FIG. 3 also preferably comprises viewer preference profile update and storage apparatus 180. The viewing information and analysis apparatus 170 is preferably operative to provide current program information and information on the current viewer, typically comprised in the television viewing information, as described above with reference to FIG. 2, to the update and storage apparatus 180. The update and storage apparatus 180 is preferably operative to store the received information in an appropriate viewer preference profile in the profile storage unit 140 of FIG. 2.

The apparatus of FIG. 3 also preferably comprises viewer preference profile retrieval apparatus 190 and program schedule customization apparatus 200. The retrieval apparatus 190 typically retrieves the viewer preference profile of a viewer under control of the program schedule customization apparatus 200 and sends the viewer preference profile to the program schedule customization apparatus 200.

The program schedule customization apparatus 200 preferably receives the viewer preference profile, as well as the program schedule information from the receiving unit 120 of FIG. 2. The program schedule customization apparatus 200 is preferably operative to customize the program schedule information received from the receiving unit 120 in accordance with one or more viewer preference profiles belonging to one or more viewers and to output a program guide comprising the customized program schedule information.

The viewing information analysis apparatus 170, the viewer preference profile update and storage apparatus 180, the view preference profile retrieval apparatus 190, and the program schedule customization apparatus 200 are typically implemented in software in one or more suitable microprocessors suitably equipped with memory, but it is appreciated that a hardware implementation may also be used.

Figure 4:
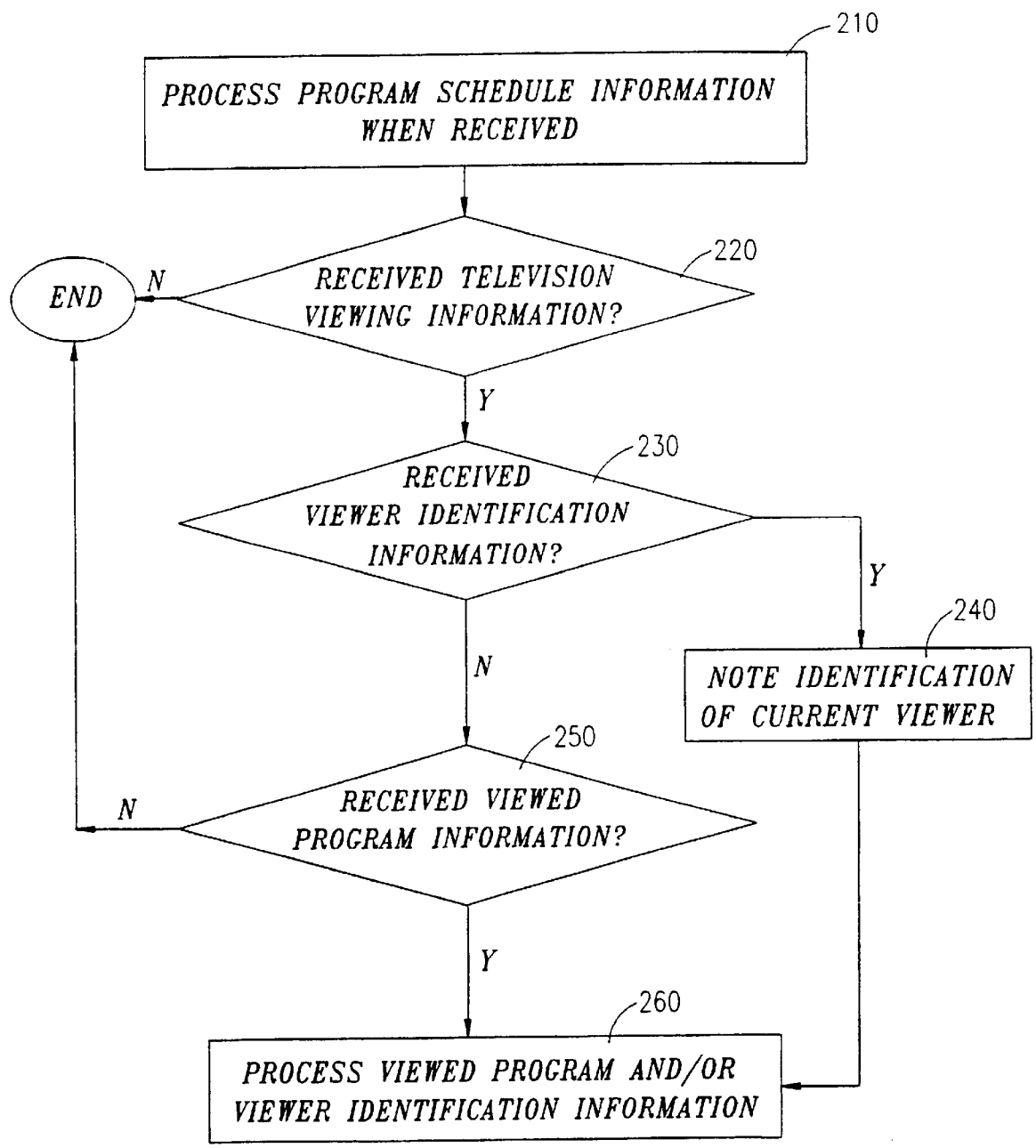
FIG. 4 is a simplified flowchart illustration of a preferred method of operation of the viewing information analysis apparatus of FIG. 3.

Reference is now made to FIG. 4, which is a simplified flowchart illustration of a preferred method of operation of the viewing information analysis apparatus of FIG. 3. The method of FIG. 4 preferably includes the following steps:

When program schedule information is received, the information is processed (step 210). Program schedule information is generally received when the program schedule information is sent over the television network. The program schedule information may be sent periodically, may be sent when there is a change in program schedule information, or may be sent at other times. Processing program schedule information preferably comprises updating a working copy of program schedule information kept in the intelligent agent 130 and used in other steps of the method of FIG. 4.

A check is made as to whether television viewing information has been received (step 220). Generally, television viewing information is received when there is a change in television viewing such as, for example: a new viewer begins viewing television according to viewer identification information; a television channel change occurs; or the television is turned on or turned off Television viewing information may also comprise an indication that a viewer has responded to a customized alert positively, by tuning to the program named in the alert, or negatively, by not tuning to the program named in the alert. Preferably, such a positive response is taken to reinforce the preference which led to the alert. A negative response, on the other hand, is preferably taken to weaken or erase the preference which led to the alert.

If no television viewing information is received, the process of FIG. 4 preferably ends.

It is appreciated that, after step 220, further action need only be taken when some television viewing information is received, on the assumption that eventually some change in television viewing will occur and further action can be taken at that time. It is further appreciated that, to prevent a possibility of no television viewing information being received for a very long time such as, for example, for an entire day, step 220 may include a check for a very long time having passed since television information has been received and, in that case, the check of step 220 may preferably behave as if television viewing information, comprising viewed program information, has been received, in order to ensure that current television viewing information, even if unchanged, is eventually stored.

If television viewing information is found to have been received in step 220, a check is made as to whether the television viewing information comprises viewer identification information (step 230). If viewer identification information has been received, the identification of the current user is noted and preferably stored (step 240). Processing continues with step 260, described below.

If the check of step 230 does not show receipt of viewer identification information, a check is made as to whether viewed program information has been received (step 250). If not, the method of FIG. 4 preferably ends. If viewed program information was found to have been received in step 250, processing continues with step 260.

In step 260, viewed program information and/or viewer identification information are processed.

Figure 5:
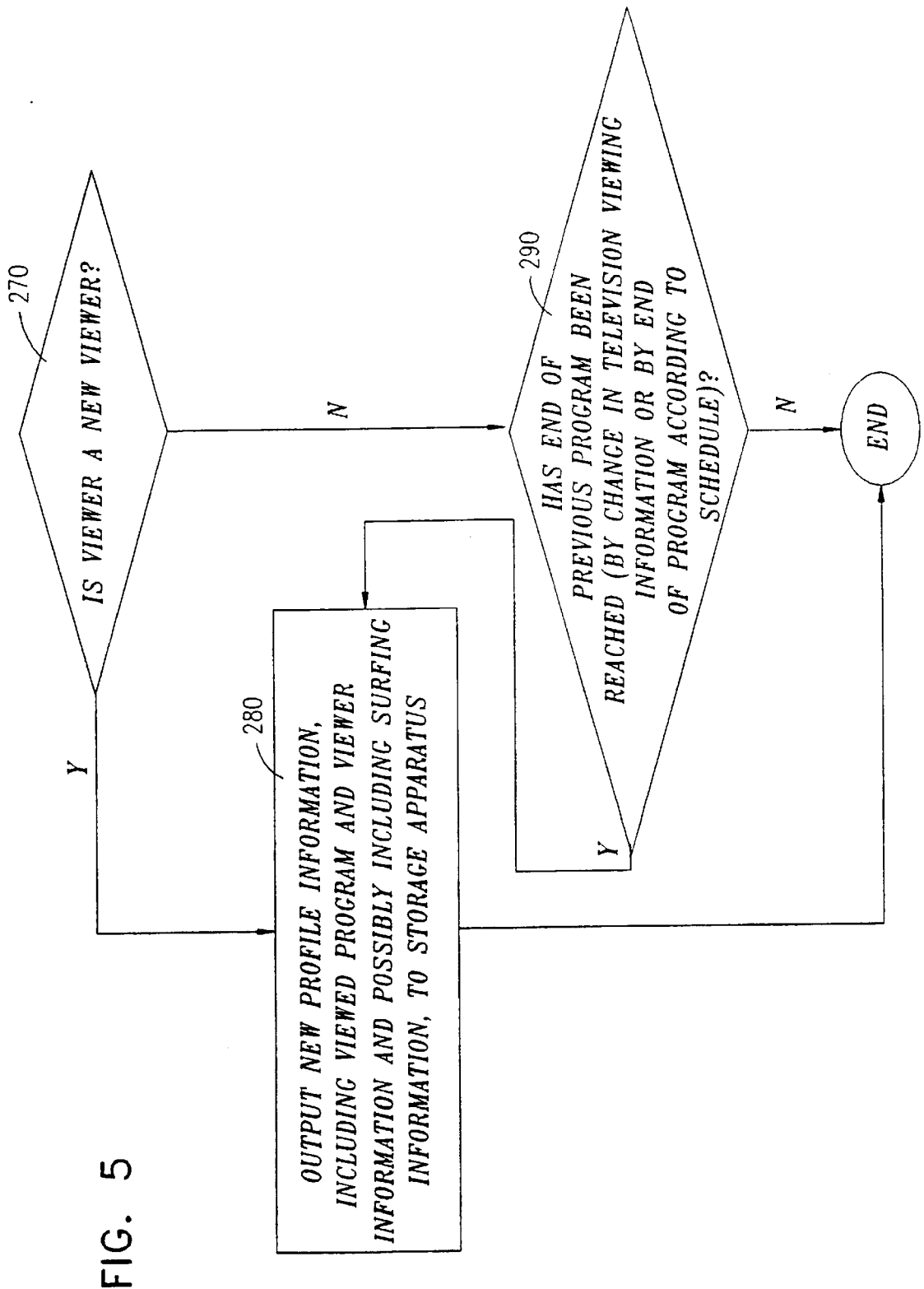
FIG. 5 is a simplified flowchart illustration of a preferred implementation of step 260 of FIG. 4.

Reference is now made to FIG. 5, which is a simplified flowchart illustration of a preferred implementation of step 260 of FIG. 4. The method of FIG. 5 preferably comprises the following steps:

Checks are made as to whether the current viewer is a new viewer (step 270) and whether the end of the previous program has been reached, whether by a change in television viewing information or by reaching the end of a program according to the program schedule information (step 290). If either the check of step 270 or the check of step 290 is found to be true, new profile information is output. (step 280). The new profile information typically includes viewed program and viewer information.

In a case where the viewed program and viewer information indicate that the viewer has viewed a program for a short period of time, the new profile information may include surfing information, that is, an indication that the viewer prefers to surf, that is, to view programs only for a short period of time. The short period of time typically comprises a predetermined period of time, also termed herein a threshold.

The surfing information may include details such as, for example, how often the user surfs and for how long the user surfs. Alternatively, information about a program which the viewer has viewed for a short period of time may be ignored and may not be included in the new profile information. The term "short period of time", as used in the context of the explanation of step 280, may include one or more of the following:

- a short absolute period of time such as, for example, less time than a threshold measured in minutes, for example, 2 minutes or 5 minutes; and
- a short relative period of time such as, for example, less than a certain percentage of the scheduled time of a program.

It is appreciated that the short period of time may vary in length according to time of day, day of week, day of year, price of a particular program, or according to any other appropriate criterion. It is further appreciated that, in a case where a viewer views different portions of a program, the times during which each portion was viewed are preferably added before comparison to the threshold.

When the profile information includes information indicating that the viewer prefers to surf, customized electronic program guide information based on the profile information may be tailored for a viewer who prefers to surf, by including randomized program selections as preferred program selections, for example.

Figure 6:
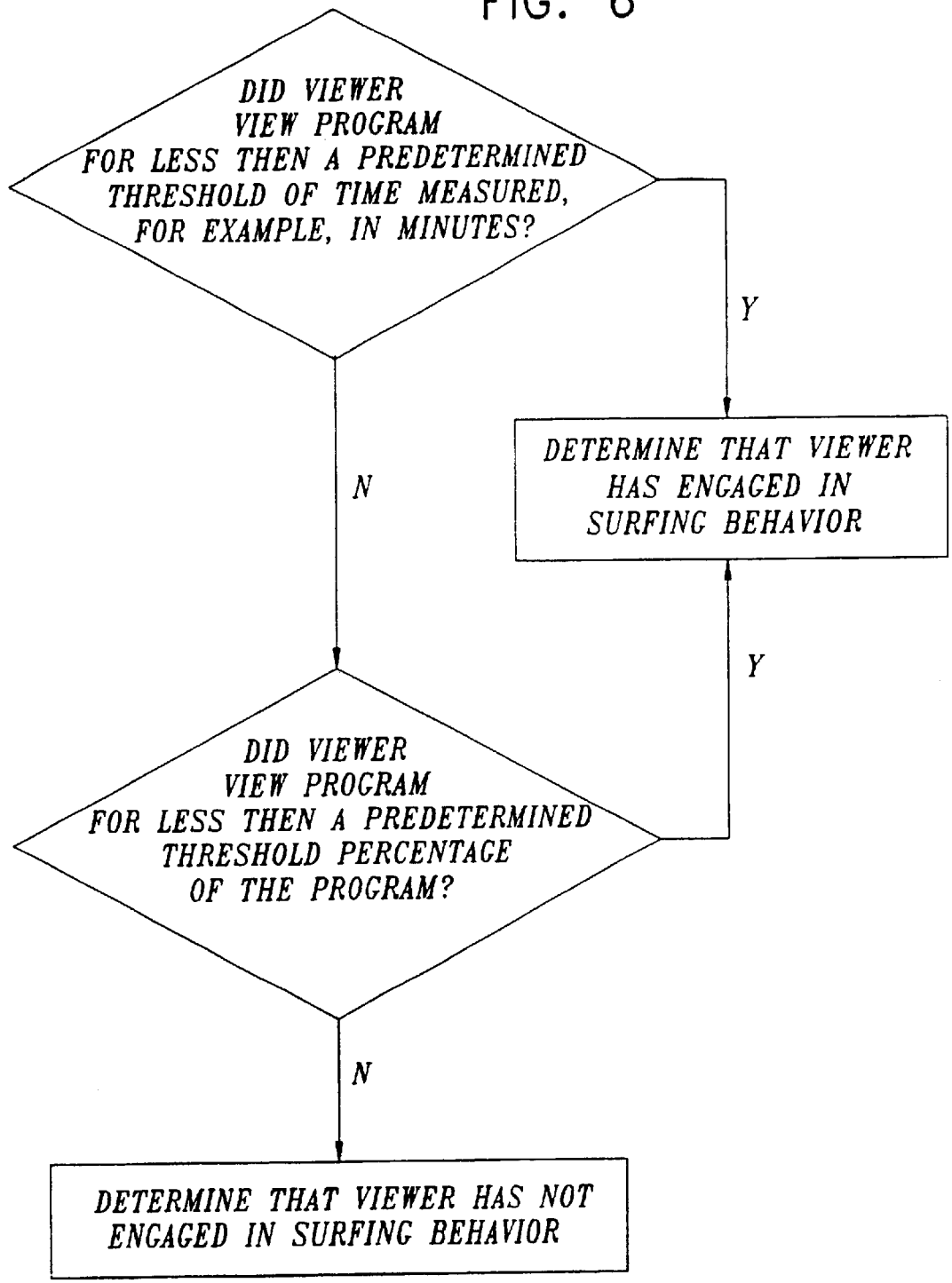
FIG. 6 is a simplified flowchart illustration of a preferred method of determining whether a viewer is engaged in surfing behavior in step 280 of FIG. 5.

Reference is now made to FIG. 6, which is a simplified flowchart illustration of a preferred method of determining whether a viewer is engaged in surfing behavior in step 280 of FIG. 5. The method of FIG. 6 is self-explanatory.

It is appreciated that the method described above with reference to FIGS. 4–6 is one particular embodiment of a method of operation of the viewing information analysis apparatus of FIG. 3. The method of FIG. 4–6 is provided by way of example only, and it is appreciated that other methods, including methods based on rule-based expert systems, as are well known in the art, may also be used.

Figure 7:
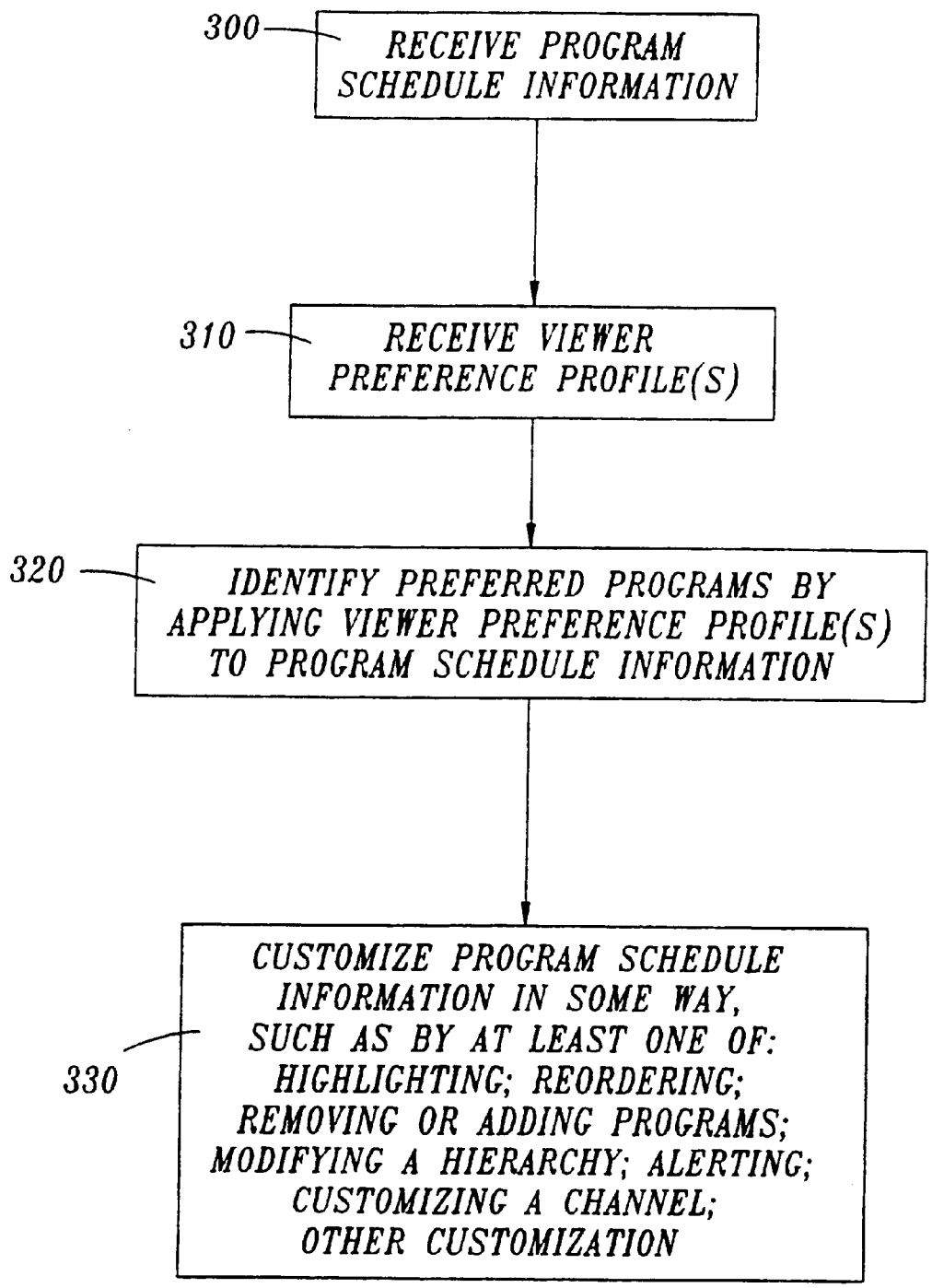
FIG. 7 is a simplified flowchart illustration of a preferred method of operation of the program schedule customization apparatus of FIG. 3.

FIG. 7 is a simplified flowchart illustration of a preferred method of operation of the program schedule customization apparatus 200 of FIG. 3. The method of FIG. 7 preferably comprises the following steps:

The program schedule customization apparatus receives program schedule information (step 300) and at least one viewer preference profile (step 310).

The program schedule customization apparatus then preferably identifies preferred programs by applying the at least one viewer preference profile to the program schedule information (step 320). It is appreciated that similar results could be obtained by modifying step 320 to identify the programs which are not preferred, and then modifying the remainder of the method of FIG. 7 accordingly.

It is also appreciated that, depending on the form of the viewer preference profiles, as described above with reference to FIG. 2, the implementation details of step 320 will vary accordingly. For example, in a case where the viewer preference profile comprises a simple data structure describing current program characteristics of programs viewed by a viewer and other information, a preferred implementation of step 320 may comprise comparing the program schedule information to the information stored in the data structure and determining that programs in the program schedule whose characteristics resemble information stored in the data structure are preferred. For example, if information stored in the data structure indicates that news programs starting at 8:00 PM or later are preferred, such a news program will be identified as preferred in step 320. In a case where the viewer preference profile comprises rules, for example, the rules will typically be applied to the program schedule information, as is well known in the art, to determine which programs are preferred.

The program schedule is then customized (step 330). As described above with reference to FIG. 2, such customization may take a wide variety of forms.

Figure 8A:
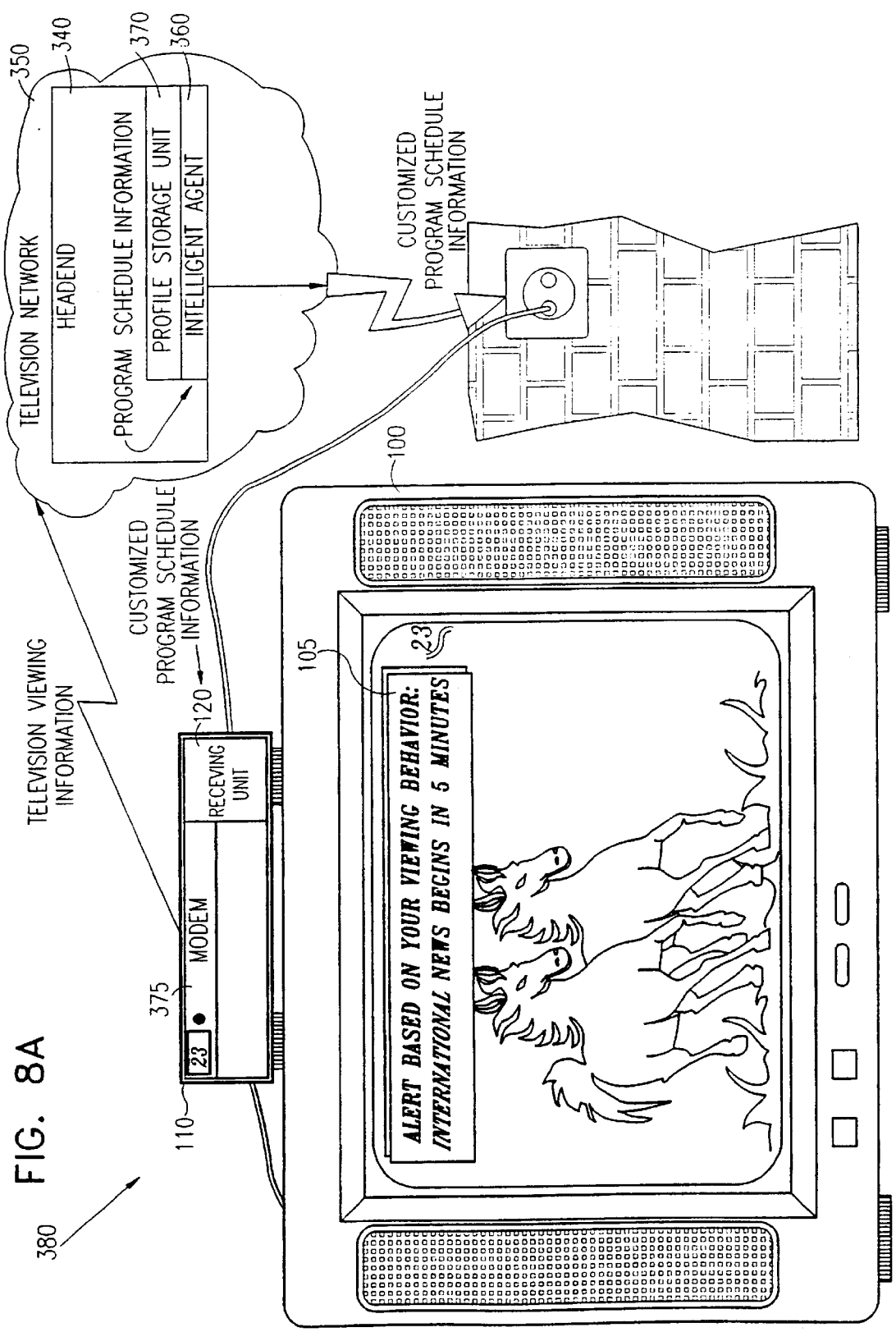
FIG. 8A is a simplified partly pictorial, partly block diagram illustration of a television system comprising a subscriber unit constructed and operative in accordance with an alternative preferred embodiment of the present invention.

Reference is now made to FIG. 8A, which is a simplified partly pictorial, partly block diagram illustration of a television system comprising a subscriber unit constructed and operative in accordance with an alternative preferred embodiment of the present invention. The system of FIG. 8A is similar to the system of FIG. 1, except as described below.

The system of FIG. 8A comprises a headend 340 comprised in or operatively associated with a television network 350. The headend 340 may be similar to conventional television system headends, as are well known in the art, except as described below.

The headend 340 comprises a headend intelligent agent 360 and a headend profile storage unit 370, which may be similar respectively to the intelligent agent 130 of FIG. 1 and the profile storage unit 140 of FIG. 1, respectively, except as follows.

Television viewing information may be transmitted to the headend 340 by a modem 375, which may be any conventional modem such as, for example, a telephone modem connected to a telephone network or a cable modem connected to a cable network. The modem 375 is typically comprised in or operatively associated with the interface unit 110. Alternatively, any appropriate means of communicating between the interface unit 110 and the headend 340 may be supplied, such as, for example, a VSAT satellite connection (not shown), as is well known in the art. The received television viewing information is processed in a manner similar to that described above with reference to the embodiment of FIG. 1.

The headend profile storage unit 370 is typically operative to store viewer preference profiles for a wide variety of viewers located at a multiplicity of sites. The intelligent agent 360 is operative to receive one or more viewer preference profiles associated with a particular site, such as a site 380, and to prepare customized program schedule information intended for the particular site. In the embodiment of FIG. 8A the headend 340 is operative to deliver the customized program schedule information to the particular site using methods well known in the art.

It is appreciated that, generally, the embodiment of FIG. 8A differs from the embodiment of FIG. 1 in that processing and storage largely occur in the headend 340. The embodiment of FIG. 8A may be preferable in a case where processing power may be provided more economically in a headend or in other cases. Furthermore, it is appreciated that, in the embodiment of FIG. 8A, certain types of customization may occur at the headend based on user preference profiles. For example, if users tend to prefer to watch a certain type of movie at a certain hour or hours of the night, that type of movie may be broadcast, either conventionally or in a near-video-on-demand system, at that hour or hours of the night. It is appreciated that other types of customization, as referred to above with respect to FIG. 2, may also occur at the headend.

It is further appreciated that other types of data processing and analysis may occur at the headend 340, the other types of data processing and analysis typically being directed to provide additional programming information to viewers. Without limiting the generality of the foregoing, it is appreciated that, at the headend 340, real-time information on a proportion or percentage of the audience viewing a particular program may be computed. The term "audience", as used throughout the present specification and claims, refers either to the sum total audience viewing all programs at a particular time, or to the total audience of viewers who are capable of receiving programs at a particular time. The real-time information may then be transmitted to subscribers and display information derived from the transmitted information may then be displayed on the display apparatus 100.

Typically, the display information may comprise an alert to a user of the display apparatus 100, similar to the alert 105, informing the user that a program on another channel is currently being viewed by a large proportion of the audience and optionally suggesting that the user tune to that program or offering the user a shortcut, as is well known in the art of television broadcasting, to quickly tune to that program. Alternatively, any appropriate method of displaying the display information, such as displaying a bar graph or other graph indicating the proportion of the audience currently viewing the program presently being viewed by the user or the proportion currently viewing some other program, may be used. It is appreciated that the display information may be displayed, for example, at one or more of the following times: throughout viewing of a program; for a short time when a user tunes to a program, and on demand by a user, typically expressed by pressing a designated button on a remote control unit (not shown) as is well known in the art.

Figure 8B:
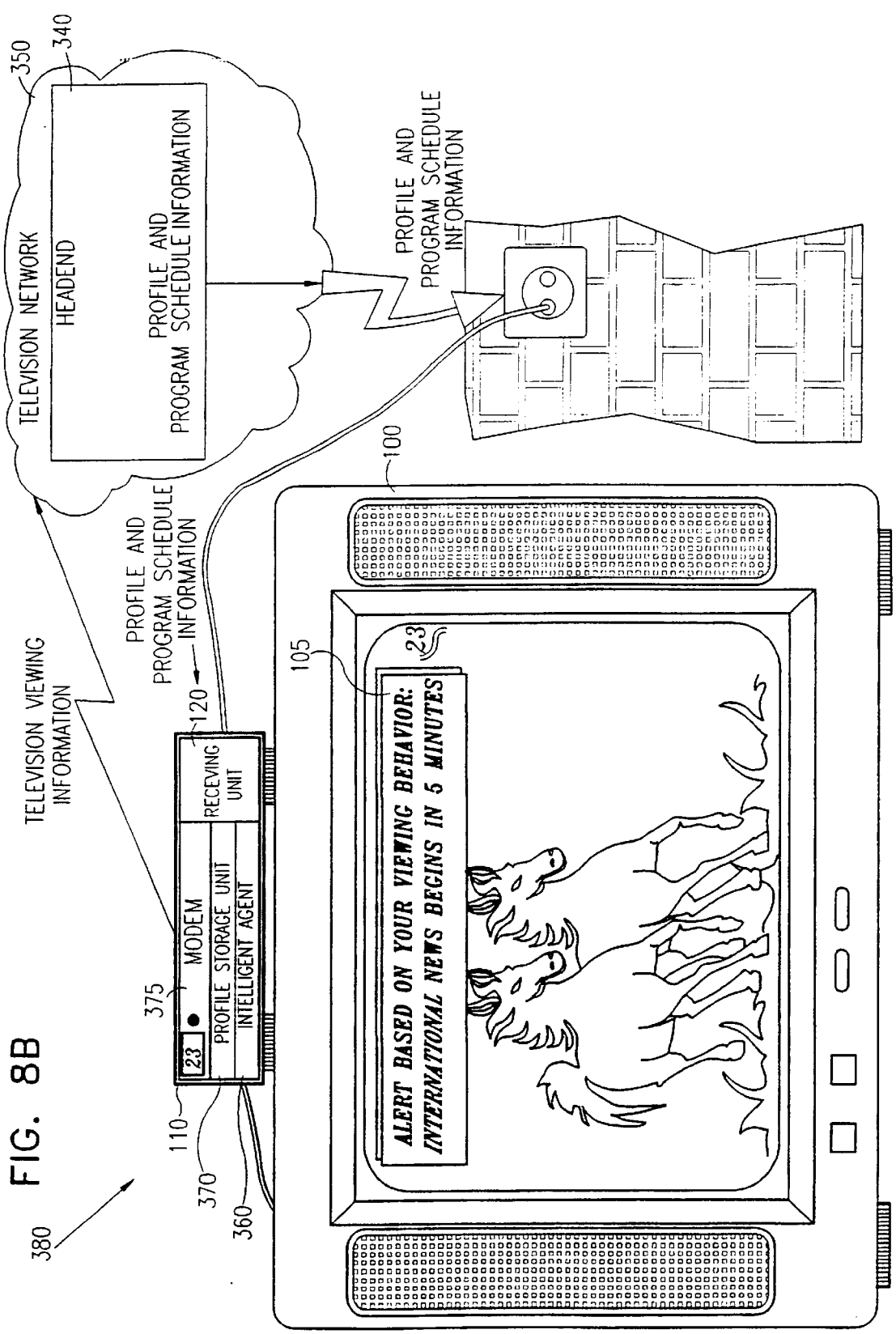
FIG. 8B is a simplified partly pictorial, partly block diagram illustration of a television system comprising a subscriber unit constructed and operative in accordance with another alternative preferred embodiment of the present invention.

Reference is now made to FIG. 8B which is a simplified partly pictorial, partly block diagram illustration of a television system comprising a subscriber unit constructed and operative in accordance with another alternative preferred embodiment of the present invention. The system of FIG. 8B is similar to the system of FIG. 8A, except that in FIG. 8B the profile storage unit 370 and the intelligent agent 360 are comprised in the interface unit 110.

The operation of the system of FIG. 8B is similar to the operation of the system of FIG. 8A, except that in the operation of the system of FIG. 8B the headend 340 is operative to deliver a user preference profile which is typically different for each site, along with program schedule information which is typically the same for each site. It is appreciated that the user preference profile may be delivered only relatively infrequently such as, for example, once per day or once per month or even less often, in which case the embodiment of FIG. 8B might be preferred because of a relatively small bandwidth required to deliver the user preference profile and the program schedule information.

Reference is now made to FIGS. 9A–9L, which are simplified pictorial representations of preferred embodiments of an electronic program guide, which may be displayed on the display of FIG. 1, of FIG. 8A, or of FIG. 8B. Each of FIGS. 9A–9L comprises, as described below, one screen display which may be part of an electronic program guide. For the purposes of the discussion below of FIGS. 9A–9L it is assumed that the viewer preference profile governing electronic program guide customization shows a preference for news programs beginning at 8:00 PM or later. It is appreciated that the same principles shown and described with reference to FIGS. 9A–9L apply to a wide variety of viewer preference profiles, including viewer preference profiles which are much more complicated than the given example.

The screen display of FIG. 9A shows a typical simplified example of a non-customized grid-type screen display, with time being shown in a first dimension and television channels being shown in a second dimension, the resulting grid being filled in with names of television programs scheduled for the indicated time and the indicated channel. As is well known in the art, various navigation techniques exist for a user of a program guide such as that of FIG. 9A to choose a given program, obtain more information about the program, book the program for future viewing, etc.

Figure 9B:
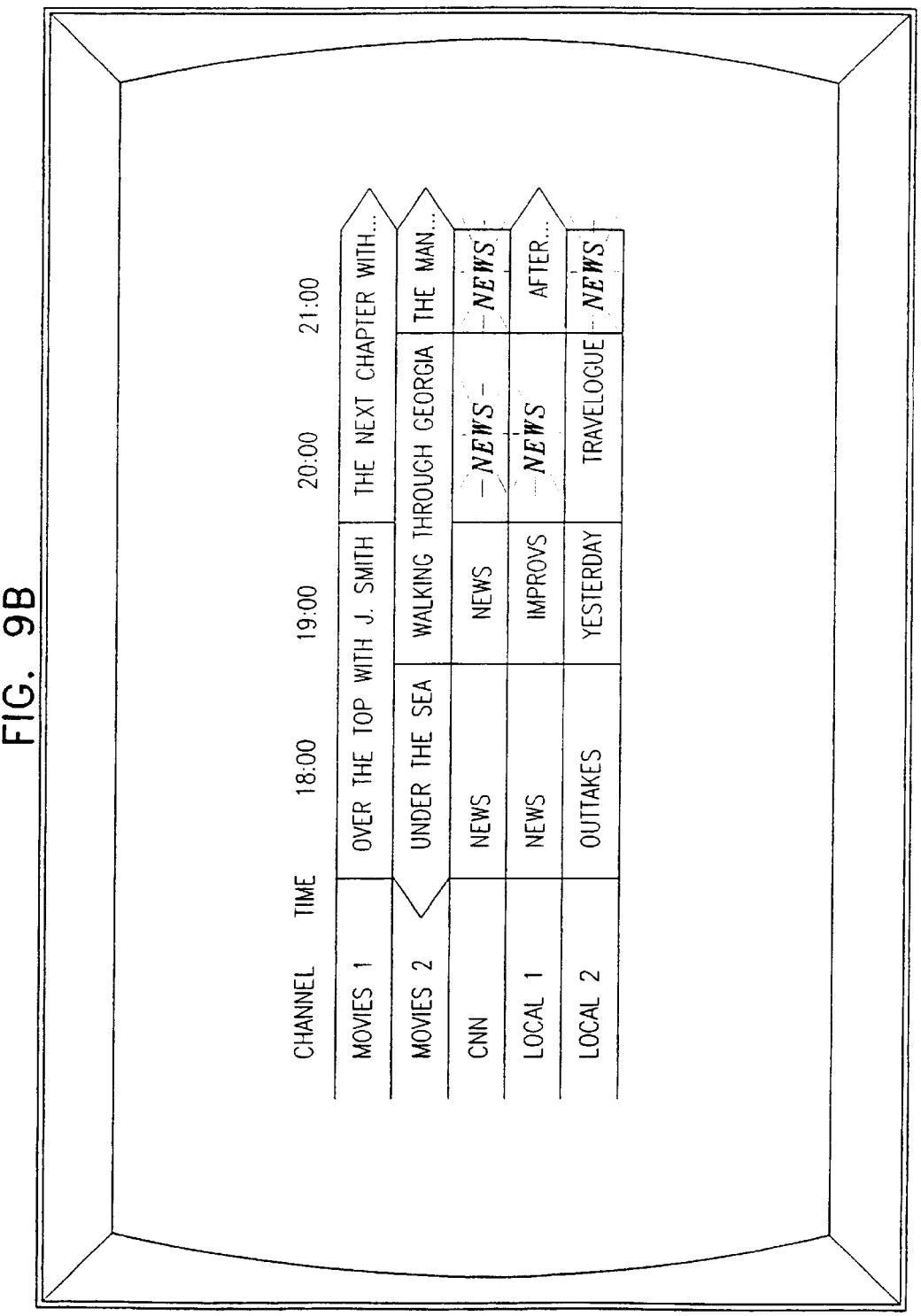

The screen display of FIG. 9B shows a typical simplified example of the screen display of FIG. 9A after customization. In FIG. 9B, news programs beginning at 8:00 PM or later are emphasized. It is appreciated that, as described above, such emphasis may be by highlighting, by a change in color, or by other means. It is appreciated that such highlighting, change in color, or other means may comprise a multi-valued scale, such that, for example, different kinds of highlighting or different colors may represent different levels of emphasis.

The screen display of FIG. 9C shows an alternative typical simplified example of the screen display of FIG. 9A after customization. In FIG. 9C, channels having news programs beginning at 8:00 PM or later have been reordered to appear at the beginning of the list of channels. It is appreciated that, in addition to reordering, emphasis as described above with reference to FIG. 9B may also be used.

Figure 9D:
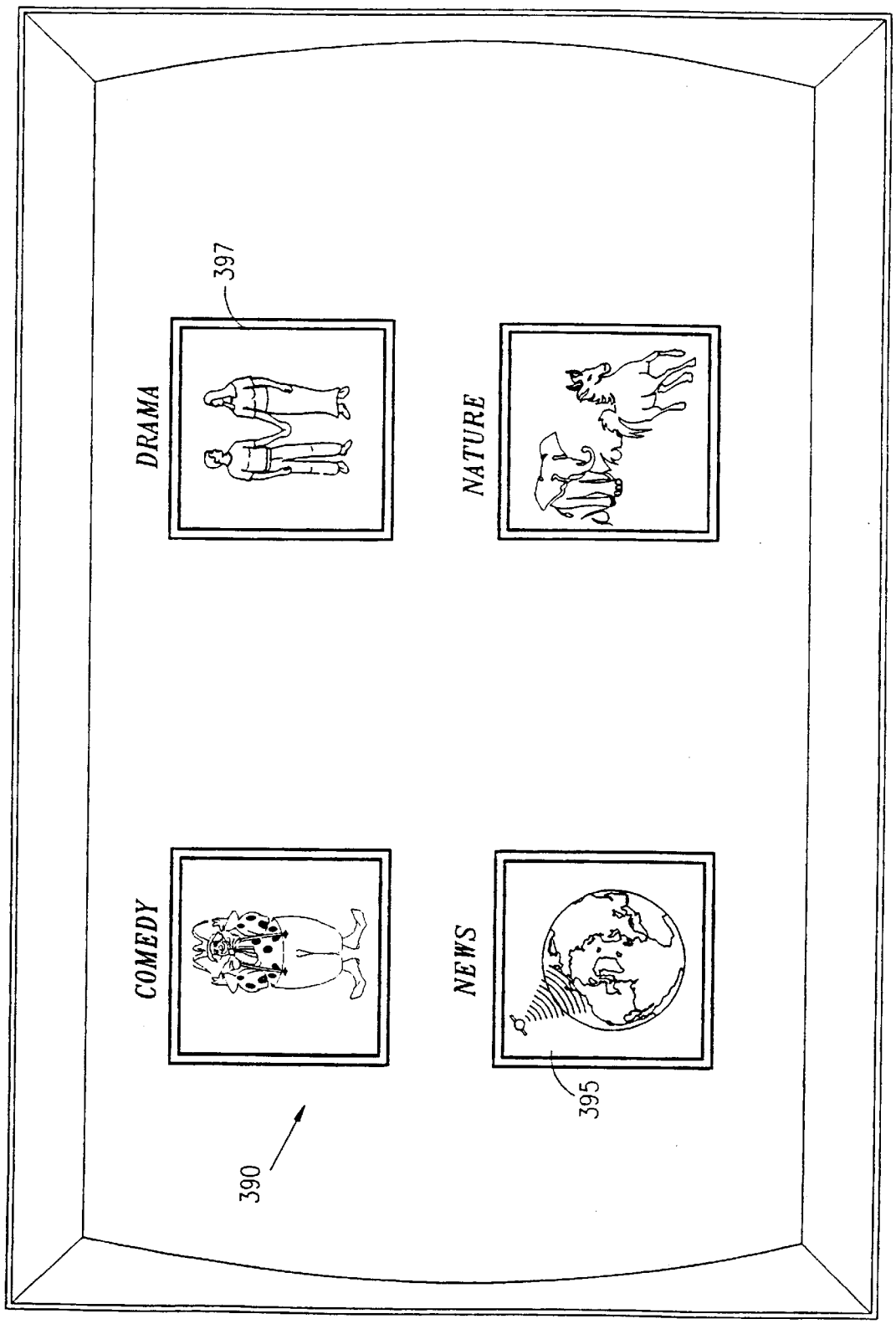

The screen display of FIG. 9D shows a typical simplified example of an icon-based non-customized electronic program guide. In FIG. 9D, the icons 390 on the screen display represent program subject matter such as, for example, comedy programs or, as indicated by a news icon 395, news programs and, as indicated by a drama icon 397, drama programs. The viewer may preferably select, using methods well known in the art such as by moving a cursor and selecting with a mouse (not shown) or other input device well-known in the art, any of the icons 390 of FIG. 9D in order to obtain more detailed information on programs falling under the selected subject matter. In FIG. 9E, the icons 390, such as an 8:00 PM icon 400, represent particular times at which programs start, and icons may preferably be selected as described above with reference to FIG. 9D.

It is appreciated that a wide variety of different methods of icon organization may be provided, of which those of FIGS. 9D and 9E are only examples. It is further appreciated that, using methods well known in the art, a viewer may choose a method of icon organization or create a custom method of icon organization. For example, icons may be used to represent listings for a particular series of programs or set of related series of programs, including a user-defined series of programs, which method of organization may be preferable in a case where users desire to see programs of a particular series.

Figure 9F:
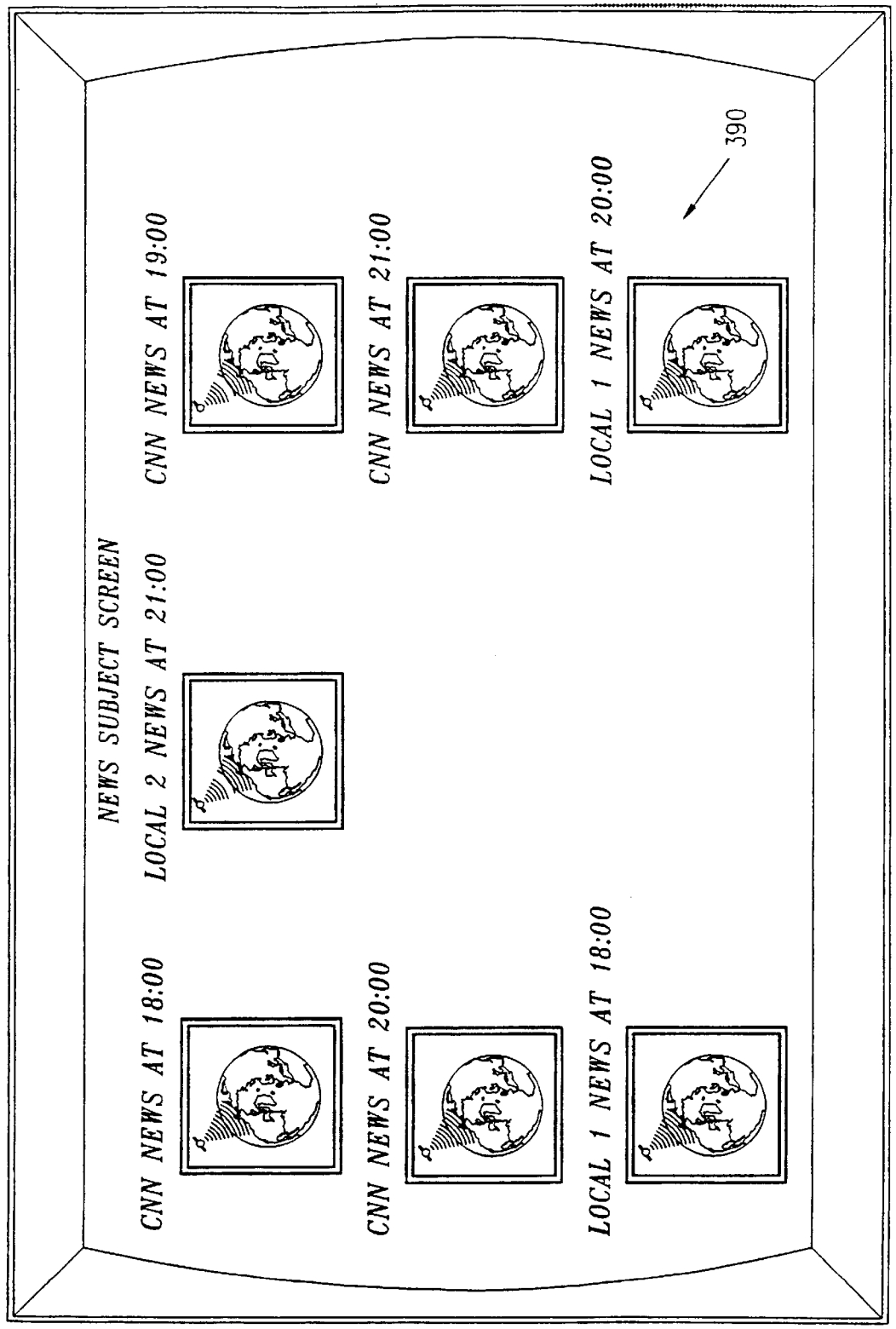
Figure 91:
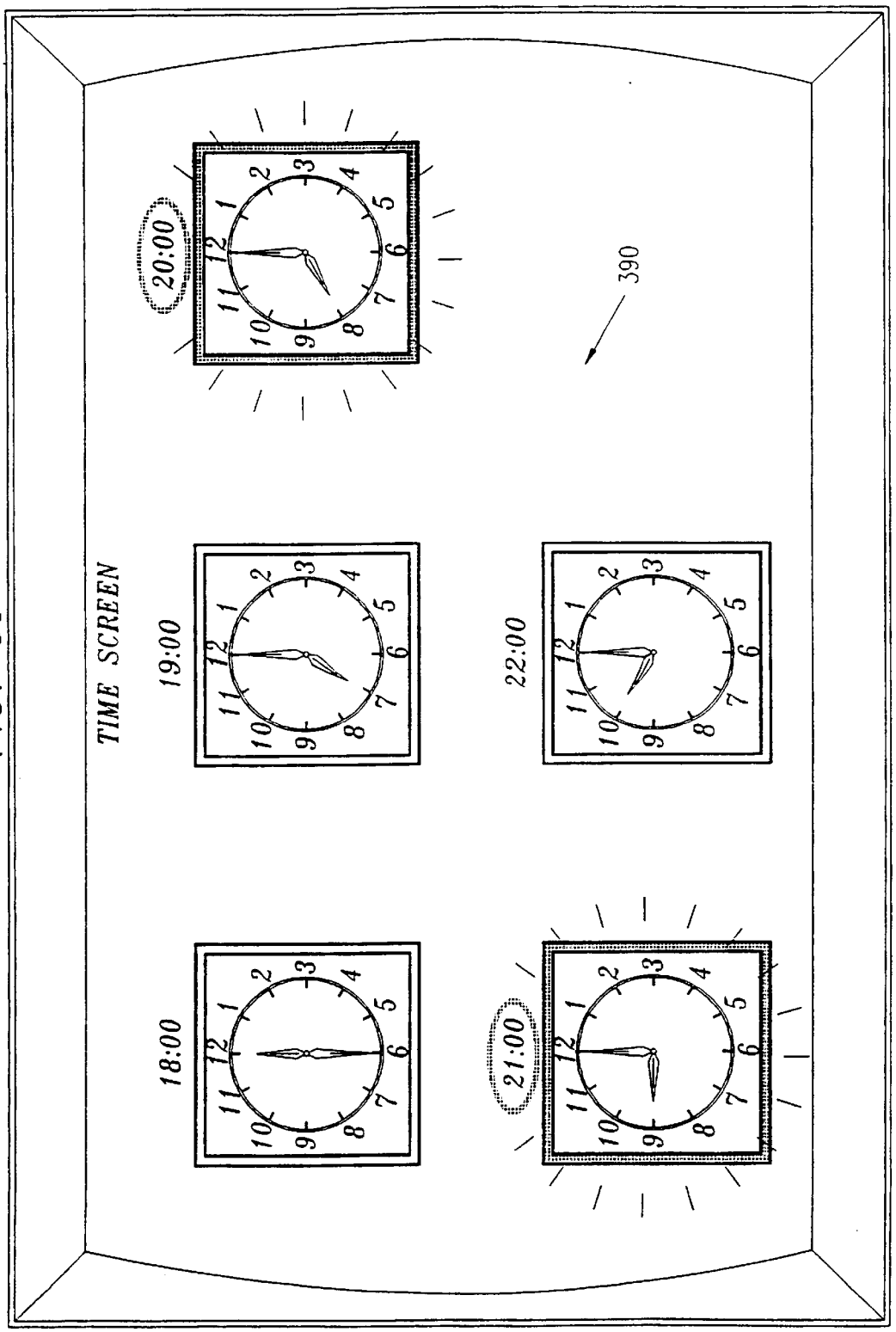

The screen display of FIG. 9F shows a typical simplified example of a screen display after a viewer selects the news icon 395 of FIG. 9D. The screen display of FIG. 9G shows a typical simplified example of a screen display after a viewer selects the 8:00 PM icon 400 of FIG. 9E.

FIGS. 9H–9K show typical simplified examples of the screen displays 9D–9G, respectively, customized to emphasize news programs beginning at 8:00 PM or later. It is appreciated that such icon-based customization may take a wide variety of forms, including: different forms of emphasis; re-ordering the hierarchical relationship between different icons and screens of icons; creating new icons; removing icons; and other forms of icon-based customization. It will be appreciated that such methods of changing the appearance and the hierarchical relationships of icons are well known in the art of computers and that those methods or any other appropriate methods could be applied to the present invention.

Figure 9L:
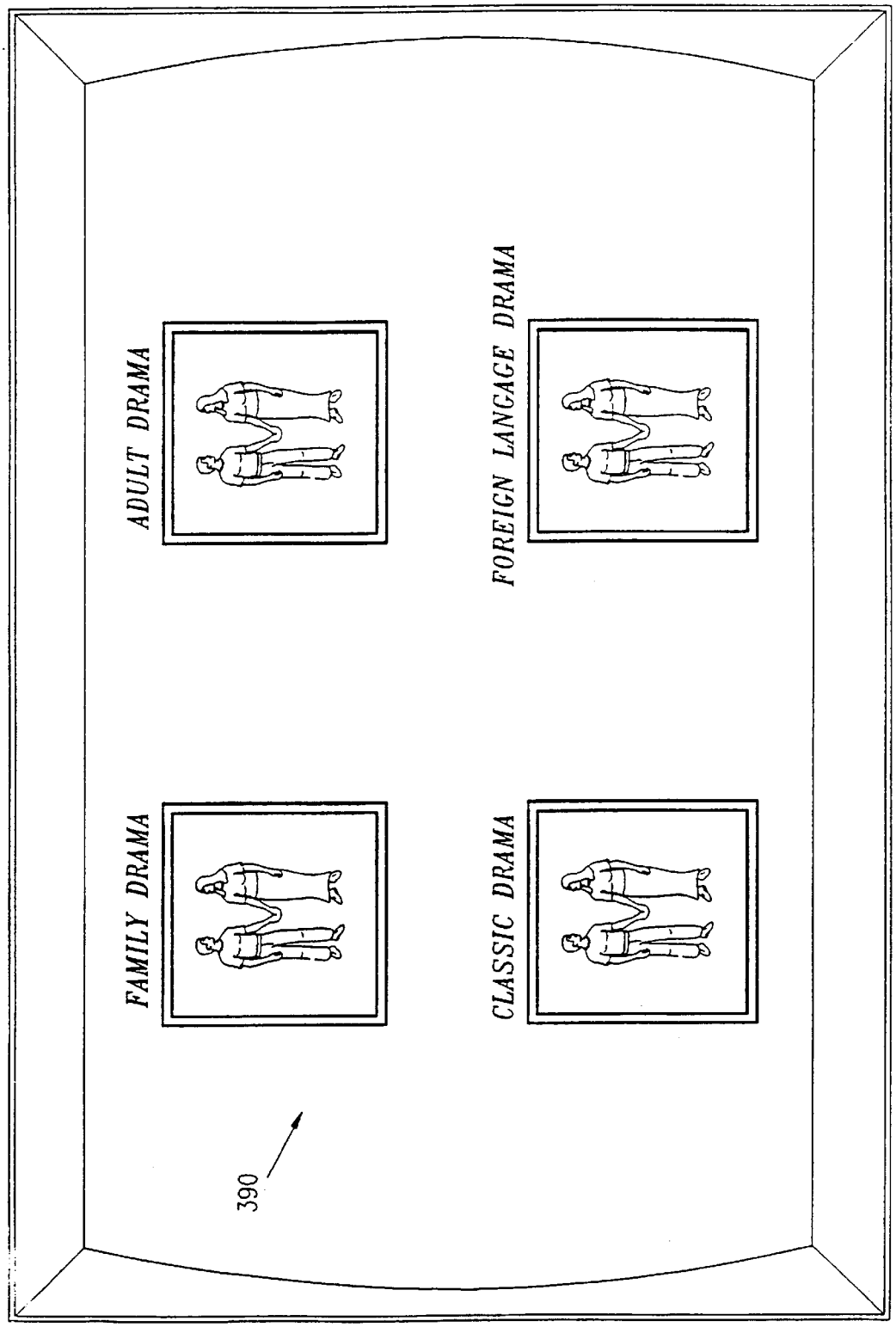

It is appreciated that the screen displays of FIGS. 9D–9G may be hierarchical and, generally, may be hierarchical to any desired depth, with a plurality of choices being generally possible at each level, and with many possible selections and/or arrangements of icons displayed at each level. To illustrate another possible level of hierarchy, FIG. 9L shows a possible hierarchical drama screen that may be displayed after user selection of the drama icon 397 of FIG. 9D.

It is further appreciated that, in FIGS. 9A–9K, any icon may be associated with additional material, which additional material may be presented to the user upon request, such as by pressing a particular button or by any other appropriate method. The additional material preferably comprises any material associated with the subject matter of the icon, particularly material which might help clarify to the user the meaning of the icon and of its underlying content. For example, and without limiting the generality of the foregoing, the additional material may comprise one or more of the following: audio material; visual material; audio-visual material; multimedia material; a computer program or other related material comprising computer instructions or software; and one or more previews of one or more associated programs. Any appropriate method known in the art, such as force tuning to a special program or downloading additional material on demand, may be used to present the additional material to the user.

It is appreciated that the additional material may be particularly useful in systems where one of a plurality of languages and/or dialects is preferred by each user and in cases where very complex character sets, such as, for example, Chinese characters and/or characters in certain other Oriental languages, are used to write a language. In such cases, audio material comprised in the additional material may provide an audio description in cases where providing a written description is technically difficult because of bandwidth limitations in presenting complex character sets or other limitations. In a case where one of a plurality of languages and/or dialects is preferred by each user, the language and/or dialect used in the additional material may be determined by one of the following: user preference information; conditional access parameters such as, for example, geographic information, as is well known in the art; or by any other appropriate method.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow.

What is claimed is:

1. A television system comprising:

a television network; and transmitting apparatus for transmitting program schedule information to a multiplicity of subscriber units, at least one of said multiplicity of subscriber units including:

a receiving unit for receiving said program schedule information from said television network;

a profile storage unit for storing at least one viewer preference profile of at least one television viewer;

an intelligent agent for customizing said program schedule information based, at least in part, on said viewer preference profile, to produce a program guide comprising customized program schedule information; and display apparatus for displaying the program guide, wherein said intelligent agent also comprises profile determination apparatus for determining viewer preference profile information for at least one television viewer and for providing said viewer preference profile information to said profile storage unit for storage as a viewer preference profile, and said profile determination apparatus determines said viewer preference profile information by monitoring television viewing behavior of said at least one television viewer, and said television viewing behavior comprises viewing only a portion of at least one viewed television program, and said profile determination apparatus compares a length of said portion of said at least one viewed television program to a predetermined viewing threshold length to determine whether said length is greater than said threshold length, and said profile determination apparatus determines said viewer preference profile information based, at least in part, on whether said length is greater than said threshold length, and when said length is determined to be less than said threshold length, said profile determination apparatus determines that said viewer is engaged in channel surfing behavior and said profile determination apparatus determines said viewer preference profile information based, at least in part, on said channel surfing behavior by modifying said viewer preference profile information to be appropriate for a user who engages in channel surfing behavior, and said program schedule information includes randomly chosen information.

2. A subscriber unit for use in a television system comprising a television network and transmitting apparatus for transmitting program schedule information, the subscriber unit comprising:

a receiving unit for receiving said program schedule information;

a profile storage unit for storing at least one viewer preference profile of at least one television viewer;

an intelligent agent for customizing said program schedule information based, at least in part, on said viewer preference profile, to produce a program guide comprising customized program schedule information; and display apparatus for displaying the program guide, wherein said intelligent agent also comprises profile determination apparatus for determining viewer preference profile information for at least one television viewer and for providing said viewer preference profile information to said profile storage unit for storage as a viewer preference profile, and said profile determination apparatus determines said viewer preference profile information by monitoring television viewing behavior of said at least one television viewer, and said television viewing behavior comprises viewing only a portion of at least one viewed television program, and said profile determination apparatus compares a length of said portion of said at least one viewed television program to a predetermined viewing threshold length to determine whether said length is greater than said threshold length, and said profile determination apparatus determines said viewer preference profile information based, at least in part, on whether said length is greater than said threshold length, and when said length is determined to be less than said threshold length, said profile determination apparatus determines that said viewer is engaged in channel surfing behavior and said profile determination apparatus determines said viewer preference profile information based, at least in part, on said channel surfing behavior by modifying said viewer preference profile information to be appropriate for a user who engages in channel surfing behavior, and said program schedule information includes randomly chosen information.

3. A television system comprising:

a television network; and transmitting apparatus for transmitting program schedule information to a multiplicity of subscriber units, the transmitting apparatus comprising a headend, the headend including:

a profile storage unit for storing at least one viewer preference profile of at least one television viewer associated with one of said multiplicity of subscriber units; and an intelligent agent for customizing said program schedule information based, at least in part, on said viewer preference profile, to produce customized program schedule information, wherein said transmitting apparatus is operative to transmit the customized program schedule information to said one of said multiplicity of subscriber units, and at least one of said multiplicity of subscriber units includes:

a receiving unit for receiving said customized program schedule information from said television network; and display apparatus for displaying a program guide comprising the customized program schedule information, wherein said intelligent agent also comprises profile determination apparatus for determining viewer preference profile information for at least one television viewer and for providing said viewer preference profile information to said profile storage unit for storage as a viewer preference profile, and said profile determination apparatus determines said viewer preference profile information by monitoring television viewing behavior of said at least one television viewer, and said television viewing behavior comprises viewing only a portion of at least one viewed television program, and said profile determination apparatus compares a length of said portion of said at least one viewed television program to a predetermined viewing threshold length to determine whether said length is greater than said threshold length, and said profile determination apparatus determines said viewer preference profile information based, at least in part, on whether said length is greater than said threshold length, and when said length is determined to be less than said threshold length, said profile determination apparatus determines that said viewer is engaged in channel surfing behavior and said profile determination apparatus determines said viewer preference profile information based, at least in part, on said channel surfing behavior by modifying said viewer preference profile information to be appropriate for a user who engages in channel surfing behavior, and said program schedule information includes randomly chosen information.

4. A headend for use in a television system comprising a television network and transmitting apparatus for transmitting customized program schedule information to at least one subscriber unit, the headend comprising:

a profile storage unit for storing at least one viewer preference profile of at least one television viewer associated with said at least one subscriber unit; and an intelligent agent for customizing said program schedule information based, at least in part, on said viewer preference profile, to produce customized program schedule information, wherein said intelligent agent also comprises profile determination apparatus for determining viewer preference profile information for at least one television viewer and for providing said viewer preference profile information to said profile storage unit for storage as a viewer preference profile, and said profile determination apparatus determines said viewer preference profile information by monitoring television viewing behavior of said at least one television viewer, and said television viewing behavior comprises viewing only a portion of at least one viewed television program, and said profile determination apparatus compares a length of said portion of said at least one viewed television program to a predetermined viewing threshold length to determine whether said length is greater than said threshold length, and said profile determination apparatus determines said viewer preference profile information based, at least in part, on whether said length is greater than said threshold length, and when said length is determined to be less than said threshold length, said profile determination apparatus determines that said viewer is engaged in channel surfing behavior and said profile determination apparatus determines said viewer preference profile information based, at least in part, on said channel surfing behavior by modifying said viewer preference profile information to be appropriate for a user who engages in channel surfing behavior, and said program schedule information includes randomly chosen information.

5. Apparatus according to claim 2 and wherein said profile determination apparatus determines viewer preference profile information, at least in part, from a reaction of said at least one television viewer to previously displayed customized program schedule information.

6. Apparatus according to claim 2 and wherein said program schedule information comprises a first plurality of criteria, at least one of said first plurality of criteria being associated with each of a second plurality of television programs, and said profile determination apparatus determines said viewer preference profile information based, at least in part, on at least one of said plurality of criteria associated with said at least one viewed television program.

7. Apparatus according to claim 2 and wherein said profile determination apparatus determines said viewer preference profile information, at least in part, in accordance with input provided by said at least one television viewer.

8. Apparatus according to claim 2 and also comprising viewer preference profile loading apparatus for providing a recorded viewer preference profile to the profile storage unit for storage.

9. Apparatus according to claim 8 wherein said viewer preference profile loading apparatus receives said recorded viewer preference profile via said television network.

10. Apparatus according to claim 2 and wherein said customizing comprises one of the following: emphasizing at least a portion of said customized program schedule information based, at least in part, on said viewer preference profile; and deemphasizing at least a portion of said customized program schedule information based, at least in part, on said viewer preference profile.

11. Apparatus according to claim 2 and wherein said customizing comprises automatically tuning to a program selected based, at least in part, on said viewer preference profile.

12. Apparatus according to claim 2 and wherein said customizing comprises automatically recording, on recording apparatus, a program selected based, at least in part, on said viewer preference profile.

13. Apparatus according to claim 2 and wherein said display apparatus is operative to display an on-screen alert comprising at least part of said customized program schedule information.

14. Apparatus according to claim 13 and wherein said on-screen alert comprises an unsolicited alert of audience viewing information comprising an indication of a proportion of an audience currently viewing a program.

15. Apparatus according to claim 13 and wherein said display apparatus displays said on-screen alert a predetermined period of time before a scheduled starting time of a television program, said at least part of said customized program schedule information comprising information associated with said television program.

16. Apparatus according to claim 2 and wherein said display apparatus comprises an icon-based guide generator for producing an icon-based hierarchical program guide comprising said program schedule information, and the program guide comprises the icon-based hierarchical program guide.

17. A method for providing a program guide in a television system, the method comprising:

providing a television network; and transmitting program schedule information to a multiplicity of subscriber units, each subscriber unit performing the following steps:

receiving said program schedule information from said television network;

storing at least one viewer preference profile of at least one television viewer;

employing an intelligent agent to customize said program schedule information based, at least in part, on said viewer preference profile, to produce a program guide comprising customized program schedule information; and displaying the program guide, wherein said intelligent agent determines viewer preference profile information for at least one television viewer and provides said viewer preference profile information for storage as a viewer preference profile, and said viewer preference profile information is determined by monitoring television viewing behavior of said at least one television viewer, and said television viewing behavior comprises viewing only a portion of at least one viewed television program, and the method also includes:

comparing a length of said portion of said at least one viewed television program to a predetermined viewing threshold length to determine whether said length is greater than said threshold length, wherein said viewer preference profile information is determined based, at least in part, on whether said length is greater than said threshold length, and when said length is determined to be less than said threshold length, a determination is made that said viewer is engaged in channel surfing behavior and said viewer preference profile information is determined based, at least in part, on said channel surfing behavior by modifying said viewer preference profile information to be appropriate for a user who engages in channel surfing behavior, and said program schedule information includes randomly chosen information.

18. A method for providing a program guide in a television system comprising a television network and transmitting apparatus for transmitting program schedule information, the method comprising:

receiving said program schedule information;

storing at least one viewer preference profile of at least one television viewer;

employing an intelligent agent to customize said program schedule information based, at least in part, on said viewer preference profile, to produce a program guide comprising customized program schedule information; and displaying the program guide, wherein said intelligent agent determines viewer preference profile information for at least one television viewer and provides said viewer preference profile information for storage as a viewer preference profile, and said viewer preference profile information is determined by monitoring television viewing behavior of said at least one television viewer, and said television viewing behavior comprises viewing only a portion of at least one viewed television program, and the method also includes:

comparing a length of said portion of said at least one viewed television program to a predetermined viewing threshold length to determine whether said length is greater than said threshold length, wherein said viewer preference profile information is determined based, at least in part, on whether said length is greater than said threshold length, and when said length is determined to be less than said threshold length, a determination is made that said viewer is engaged in channel surfing behavior and said viewer preference profile information is determined based, at least in part, on said channel surfing behavior by modifying said viewer preference profile information to be appropriate for a user who engages in channel surfing behavior, and said program schedule information includes randomly chosen information.

19. A method for providing a program guide in a television system, the method comprising:

providing a television network; and transmitting program schedule information to a multiplicity of subscriber units, wherein the step of transmitting comprises:

storing at least one viewer preference profile of at least one television viewer associated with one of said multiplicity of subscriber units;

employing an intelligent agent to customize said program schedule information based, at least in part, on said viewer preference profile, to produce customized program schedule information;

transmitting the customized program schedule information to said one of said multiplicity of subscriber units;

receiving, at said one of said multiplicity of subscriber units, said customized program schedule information from said television network; and displaying a program guide comprising the customized program schedule information, wherein said intelligent agent determines viewer preference profile information for at least one television viewer and provides said viewer preference profile information for storage as a viewer preference profile, and said viewer preference profile information is determined by monitoring television viewing behavior of said at least one television viewer, and said television viewing behavior comprises viewing only a portion of at least one viewed television program, and the method also includes:

comparing a length of said portion of said at least one viewed television program to a predetermined viewing threshold length to determine whether said length is greater than said threshold length, wherein said viewer preference profile information is determined based, at least in part, on whether said length is greater than said threshold length, and when said length is determined to be less than said threshold length, a determination is made that said viewer is engaged in channel surfing behavior and said viewer preference profile information is determined based, at least in part, on said channel surfing behavior by modifying said viewer preference profile information to be appropriate for a user who engages in channel surfing behavior, and said program schedule information includes randomly chosen information.

20. A method for providing a program guide in a television system comprising a television network and transmitting apparatus for transmitting customized program schedule information, the method comprising:

storing at least one viewer preference profile of at least one television viewer associated with one of said multiplicity of subscriber units; and customizing said program schedule information, using an intelligent agent, based, at least in part, on said viewer preference profile, to produce customized program schedule information, wherein said intelligent agent determines viewer preference profile information for at least one television viewer and provides said viewer preference profile information for storage as a viewer preference profile, and said viewer preference profile information is determined by monitoring television viewing behavior of said at least one television viewer, and said television viewing behavior comprises viewing only a portion of at least one viewed television program, and the method also includes:

comparing a length of said portion of said at least one viewed television program to a predetermined viewing threshold length to determine whether said length is greater than said threshold length, wherein said viewer preference profile information is determined based, at least in part, on whether said length is greater than said threshold length, and when said length is determined to be less than said threshold length, a determination is made that said viewer is engaged in channel surfing behavior and said viewer preference profile information is determined based, at least in part, on said channel surfing behavior by modifying said viewer preference profile information to be appropriate for a user who engages in channel surfing behavior, and said program schedule information includes randomly chosen information.

* * * * *